(12) United States Patent
Fujita et al.

(10) Patent No.: US 6,854,805 B2
(45) Date of Patent: Feb. 15, 2005

(54) SEAT STRUCTURE

(75) Inventors: Etsunori Fujita, Hiroshima (JP); Seiji Kawasaki, Hiroshima (JP); Yasuhide Takata, Hiroshima (JP); Akihito Asano, Hiroshima (JP); Naoki Ochiai, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/393,163

(22) Filed: Mar. 20, 2003

(65) Prior Publication Data

US 2003/0193231 A1 Oct. 16, 2003

(30) Foreign Application Priority Data

Mar. 27, 2002 (JP) ........................................ 2002-089095
Oct. 16, 2002 (JP) ........................................ 2002-302168

(51) Int. Cl.[7] ................................................ A47C 7/02
(52) U.S. Cl. .............................................. 297/452.56
(58) Field of Search ......................... 297/258.1, 452.56, 297/452.54, 452.5, 337, 311, 270.1

(56) References Cited

U.S. PATENT DOCUMENTS

| | | | | |
|---|---|---|---|---|
| 2,633,184 A | | 3/1953 | Karg ........................... | 155/179 |
| 3,387,884 A | * | 6/1968 | Mutz, Jr. ................... | 297/302.4 |
| 4,124,201 A | | 11/1978 | Burton ......................... | 267/99 |
| 5,692,727 A | | 12/1997 | Kashiwamura et al. ..... | 248/608 |
| 5,735,578 A | * | 4/1998 | Penley .................. | 297/440.11 |
| 6,604,792 B1 | * | 8/2003 | Picard .................... | 297/452.56 |

FOREIGN PATENT DOCUMENTS

| | | |
|---|---|---|
| BE | 399318 | 10/1933 |
| EP | 0548924 | 6/1993 |
| FR | 76664 | 11/1959 |

* cited by examiner

Primary Examiner—Milton Nelson, Jr.
(74) Attorney, Agent, or Firm—Steinberg & Raskin, P.C.

(57) ABSTRACT

A seat structure includes a torsion bar 12 disposed along the width direction, and an arm 13 which is connected to the torsion bar 12, enforced in the direction of falling backward at a normal state by the torsion bar 12 in the rear of a seat cushion 10, and disposed is a flat-type supporting member 15 between the supporting frame 14 supported by the arm 13 and a frame member provided in front of the seat cushion, being strained by the elastic force of the torsion bar 12. Through this structure, the spring characteristic to give an influence on comfortability and riding comfort at the time of being seated can be given by the torsion bar 12, so that the number of coil springs which have been necessary in the vicinity of the body side can be reduced or the use of the coil spring can be stopped.

21 Claims, 22 Drawing Sheets

TEST SPEED : 50 mm/min
BOARD : φ30 mm

TEST SPEED : 50 mm/min
BOARD : φ98 mm

TEST SPEED : 50 mm/min
BOARD : φ200 mm

TEST SPEED : 50 mm/min
BOARD : φ30 mm

TEST SPEED : 50 mm/min
BOARD : φ98 mm

TEST SPEED : 50 mm/min
BOARD : φ200 mm

Logsweep:0.5-15Hz
Amplitude:1mm(2mmp-p)

TWO-LAYER SECTION

SEAT STRUCTURE

BACKGROUND OF THE INVENTION

1. Field of the Invention

The present invention relates to a seat structure, to be more in detail, relates to a seat structure suitable used for a seat for a transportation machine such as a plane, train, ship, fork lift, and automobile, or for various chairs or wheel chairs used in the inside or outside of a building.

2. Description of the Related Art

For a seat for a plane, train, ship, automobile, and the like, not only improvement of basic functions such as impact absorbency, vibration absorbency, and so on, but also to supplement these functions and obtain better ride comfort, improvement of various functions such as physique difference absorbency, posture difference absorbency, body movability, and so on are always requested. Further, in recent years, in order to reduce weight of transportation devices such as automobiles from the view point of environmental measure by improving fuel economy, in addition to improvement of various functions described-above, the reduction in weight of seat used for these transportation devices is required, and technology to use a thinner and lighter cushion material and the like are proposed.

For instance, from the above point of view, the present applicant has proposed a seat structure with sufficient characteristics (spring characteristic and damping characteristic) as a cushion structure though light in weight by using a three-dimensional net member (a solid knitted fabric) having a thickness of about several millimeters to several tens millimeters strained to frames as a tension structure.

However, in order to display sufficiently the characteristics required for a seat of automobile or the like using such a solid knitted fabric, it is necessary to make vibration absorbency, physique difference absorbency, and the like serve effectively by disposing a flat-type supporting member composed of a two-dimensional net member or a solid knitted fabric, or a flat-type elastic member called Plumaflex under the solid knitted fabric, and by supporting it with plural metal springs (coil spring) to supplement a feeling of spring and to support the load dispersedly. However, when plural coil springs are disposed, since the solid knitted fabric itself is thin, a seated person often feels hitting of the coil spring under the solid knitted fabric as a feeling of something foreign. Accordingly, increase of number of solid knitted fabric layers or disposition of other cushion structure such as a urethane member between the solid knitted fabric and the coil springs have been put into practice conventionally. Therefore, if the number of disposed coil springs that cause a feeling of something foreign can be reduced, or if the coil springs can be disposed to somewhere not likely to be felt as a something foreign, further reduction in weight can be expected by reducing the number of the solid knitted fabric layers or disappearing of necessity to intercalate other cushion structure such as a urethane member.

When the urethane member that has been generally used as a cushion structure is used, in order not to make a seated person feel something foreign for items different in stiffness such as wire and frames, it is a usual manner to ensure the thickness of urethane to be 30 mm or more. But when material that is made thinner in thickness and lighter in weight is used, there arises a similar disadvantage as the case of the solid knitted fabric. When other cushion structure such as a two-dimensional net member containing an elastic yarn is used, there arises a similar disadvantage due to thinness of the thickness. When plural two-dimensional net members, solid knitted fabrics, or urethane materials are used in combination in arbitrary number, a thinner and a lighter cushioning structure can be obtained by reducing the number of disposing the coil springs or changing the place of disposition.

Further, in particular, as for the impact absorbency required for a seat for transportation device such as an automobile, reduction of rebound of the human body from a seat at the time of collision is required. As a measure for this requirement, required is a structure to disperse a collision load received in the longitudinal direction by changing a seating angle so that depression of the haunches becomes large through conversion of the rotational moment of inertia force around a tuber of ischium.

On the other hand, a standard posture of a person seating on a chair is a state that the haunches are positioned at the rear of a seat cushion of the chair, and the waist abuts on a seat back of the chair. However, it is reported that, as a seating posture of a person, especially in the case of a small physique such as an elderly person and a child, or in the case of seating for a long time, a way of sitting called a sacrum posture that the haunches move toward front to make the sacrum portion touch a seat cushion (Study of Designing Bulletin of JSSD Vol. 48, No. 1, 2000. p49 to 56, "Suspension Optimum Characteristic of a Wheel Chair for Handicapped Person Taking Difference in Physique into Consideration") The same thing can be said of a seat for a transportation device such as an automobile, a chair for office work or for theater as well as a wheel chair, and required is development of a seat structure which absorbs difference in physique and difference in posture without damaging impact absorbency or vibration absorbency so much and attains a comfortable feeling of seating.

SUMMARY OF THE INVENTION

The present invention has been made in view of the above situation and the objects thereof is to provide a seat structure that enables to realize further reduction in weight than conventional ones and to improve various functions such as impact absorbency, vibration absorbency, absorbency of difference in physique, absorbency of difference in posture, body movability, and so on.

In order to achieve the above objects, the present inventor has thought that by using a torsion bar disposed at a place where a seated person is not likely to feel something foreign in place of a coil spring conventionally disposed in the vicinity of the body, the above various characteristics can be improved as well as the reduction of the weight, and has completed the present invention.

That is, the present invention described in claim 1 provides a seat structure comprising: an arm disposed on the rear of a seat cushion, and enforced in the direction of falling backward with a torsion bar in a normal state; and a flat-type supporting member put over between a supporting frame supported by said arm and a frame member disposed in front of the seat cushion, being strained by an elastic force of the torsion bar.

The present invention described in claim 2 provides the seat structure further comprising a stopper member to control a range of the pivot movement when said arm pivots in the direction of falling forward against the elastic force of the torsion bar when said flat-type supporting member receives a load nearly in the vertical direction.

The present invention described in claim 3 provides the seat structure according to claim 1, wherein said torsion bar is disposed along the width direction on the rear of the seat cushion.

The present invention described in claim 4 provides the seat structure according to claim 1, wherein said flat-type supporting member is suspended on said supporting frame, and connectedly strained by said torsion bar disposed below the supporting frame at the rear end portion of said flat-type supporting member.

The present invention described in claim 5 provides the seat structure according to claim 1, wherein said flat-type supporting member is fixed in a manner that the rear end portion thereof is fixed on said supporting frame in intimate contact with the outer face of said supporting frame so that a fold-back portion of the rear end portion folded back along the outer face of the supporting frame does not overlap on a portion positioned in front of the rear end portion abutting said supporting frame.

The present invention described in claim 6 provides the seat structure according to claims 1, further comprising an auxiliary spring means disposed between said flat-type supporting member and any one of the frame members.

The present invention described in claim 7 provides the seat structure according to claim 6, wherein said auxiliary spring means comprises a coil spring put over between an engaged portion positioned within 150 mm front and 150 mm behind of the barycentric position of the body at the time of being seated, and any one of the frame members positioned in the rear of the seat cushion.

The present invention described in claim 8 provides the seat structure according to claim 6, wherein said engaged portion comprises a wire member supported in the middle in the longitudinal direction and along the width direction of said flat-type supporting member, and has a structure that one end of said coil spring is engaged to the wire.

The present invention described in claim 9 provides the seat structure according to claim 8, wherein at least a portion of said wire member is loosely inserted in a wire supporting member disposed on the flat member.

The present invention described in claim 10 provides the seat structure according to claim 9, wherein said wire supporting member comprises plural cylindrical members provided with the above-described wire inserting portions, at least cylindrical members supporting the vicinity of both ends of the wire member are fixed to the flat-type supporting member at the front sides of the cylindrical members so that the wire inserting portions are located at the rear sides, and the cylindrical member supporting nearly central portion of the wire member is fixed to the flat-type supporting member at the rear side so that the wire inserting portion is located at the front side.

The present invention described in claim 11 provides the seat structure according to claim 7, wherein said auxiliary spring means comprises a flat-type elastic member disposed below said flat-type supporting member having a structure in which the front wire portion thereof is connectedly supported by any one of the frame members, the rear wire portion constitutes said engaged portion, and one end of said coil spring is engaged to the rear wire portion.

The present invention described in claim 12 provides the seat structure according to claim 8, wherein the wire member is made of spring steel.

The present invention described in claim 13 provides the seat structure according to claim 2, wherein said stopper member is made of an elastic member.

The present invention described in claim 14 provides the seat structure according to claim 1, wherein the load-deflection characteristic of said flat-type supporting member when being pressurized substantially in the vertical direction in a strained state is nearly equal to or lower than the load-deflection characteristic of muscles in the human body.

The present invention described in claim 15 provides the seat structure according to claim 14, wherein said flat-type supporting member comprises any one kind selected from a two-dimensional net member, a solid knitted fabric, and a urethane member or a combination of two kinds or more of these members.

The present invention described in claim 16 provides the seat structure according to claim 15, wherein said flat-type supporting member is made from a combination of the same kind or different kind of materials, and is composed of the combination of materials different in spring characteristic or in damping characteristic.

The present invention described in claim 17 provides the seat structure according to claim 1, further comprising a cushioning member for the seat cushion provided above said flat-type supporting member, wherein said cushioning member is disposed in the rear of the seat cushion at the rear end portion thereof, supported together with said flat-type supporting member by a supporting frame enforced in the direction of falling backward in a normal state with a torsion bar through said arm, and the tension of said cushioning member for the seat cushion in the longitudinal direction at the time of being seated is lower than that at the time of no load as a result of falling forward of said supporting frame due to the load when seating.

The, present invention described in claim 18 provides the seat structure according to claim 17, wherein said cushioning member for the seat cushion is engaged to the frame member provided in front of the seat cushion or to the flat-type supporting member engaged to the frame member at only one portion of the front end portion of said cushioning member for the seat cushion.

The present invention described in claim 19 provides the seat structure according to claim 18, wherein a portion having a predetermined width at nearly central portion in the width direction in the front end portion of said cushioning member for the seat cushion is engaged to the frame member provided in front of the seat cushion or the flat-type supporting member engaged to the frame member.

The present invention described in claim 20 provides the seat structure according to claim 1, further comprising a cushioning member for a seat back, wherein said cushioning member for the seat back is connected to the cushioning member for the seat cushion at the lower end portion of said cushioning member for the seat back, and has a bulging shape bulging out forward at nearly central portion of the cushioning member for the seat back.

The present invention described in claim 21 provides the seat structure according to claim 20, further comprising an elastic member engaged to the back face of said cushioning member for the seat back, wherein each end portion of said elastic member is engaged to the back face of said cushioning member for the seat back at predetermined intervals in the vertical direction, and nearly central portion of the cushioning member for the seat back is bulged out forward by the tension of the elastic member.

DETAILED DESCRIPTION OF THE PREFERRED EMBODIMENT(S)

Figure 1:
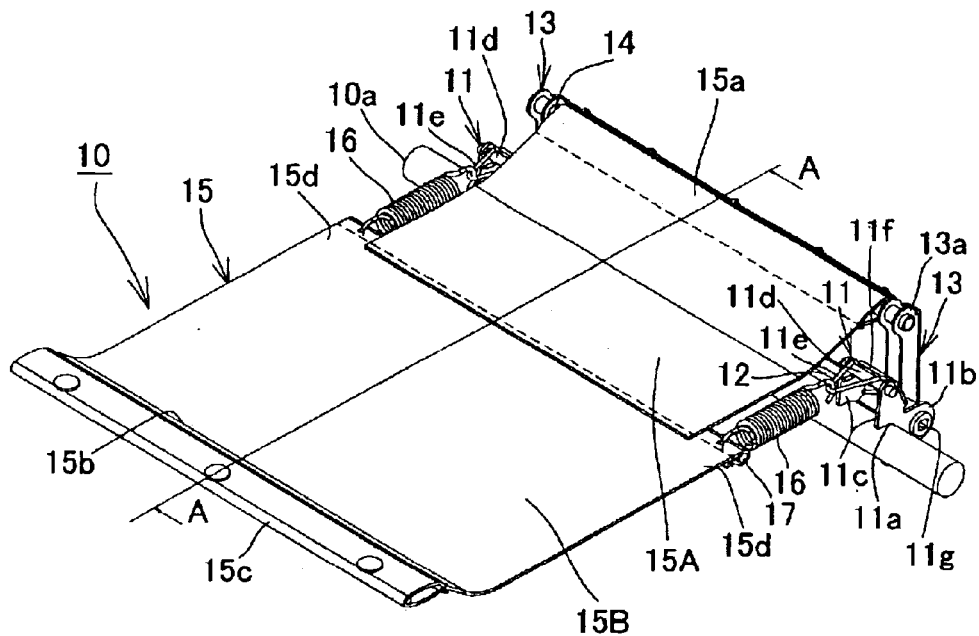
FIG. 1 is a schematic perspective view showing a seat cushion composing a seat structure according to an embodiment of the present invention.
Figure 2:
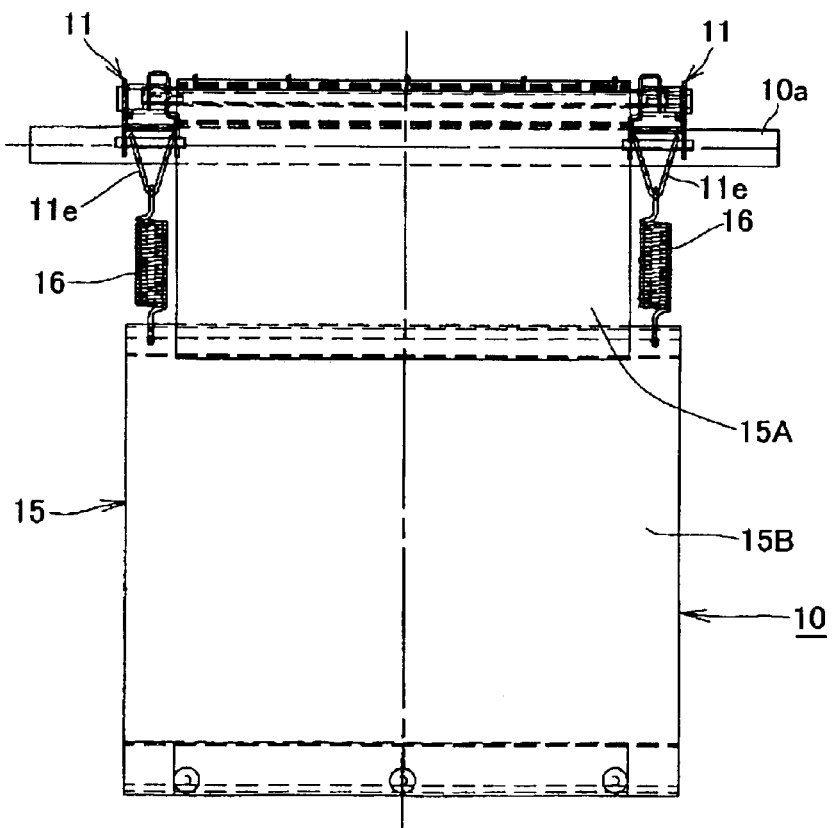
FIG. 2 is a plan view of the seat cushion composing a seat structure according to the above-described embodiment.
Figure 3:
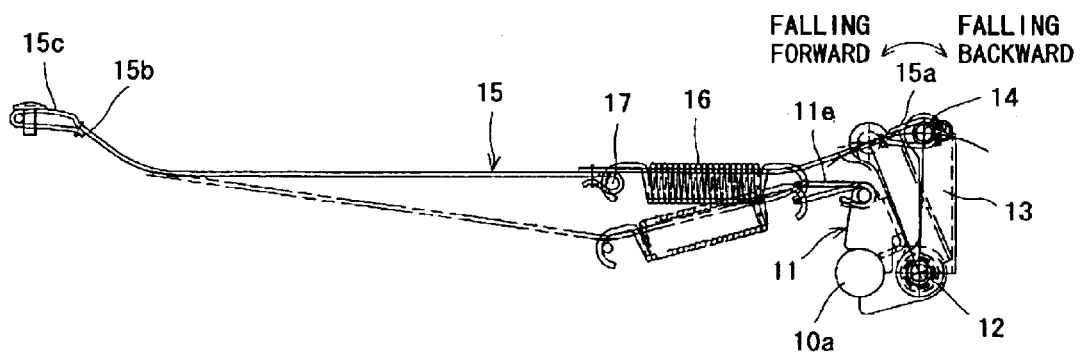
FIG. 3 is a sectional view taken along the line A—A in FIG. 1.

The present invention will be explained further in detail based on embodiments shown in the drawings below. FIG. 1 to FIG. 3 are views showing a principal portion of a seat structure relating to an embodiment of the present invention. As shown in these drawings, a seat cushion 10 composing the seat structure of the present embodiment comprises brackets 11, a torsion bar 12, arms 13, a supporting frame 14, a flat-type supporting member 15, coil springs 16 and so on.

Two pieces of the brackets 11 are fixedly disposed apart from each other to a rear frame 10a laterally (in the width direction) arranged behind the seat cushion 10. The bracket 11 is provided with a fitting groove 11a fitting to a rear frame 10a at the front side thereof, and a projecting plate 11b projecting in the behind thereof. A supporting shaft 11d is laid between side plates 11c which are positioned above a portion where the fitting groove 11a is formed and opposedly disposed respectively, and the supporting shaft 11d is provided with an engaging ring 11e engaged with the other end of a coil spring which will be described later. A rear edge of the side plate 11c is formed to be inclined divergently, and a plate rubber 11f is provided on the rear end. The plate rubber 11f serves as a stopper member controlling the range of pivoting of the arm 13 in the direction of falling forward by abutting of the arm 13 which will be described later. Thus, the stopper member is preferably composed of an elastic member such as rubber and the like, and when the arm 13 abuts the plate rubber 11f, its buffering function can be acted.

On the projecting plate 11b of the other bracket 11, a square fitting hole 11g is formed, and one end portion (fixed end) of the torsion bar 12 is fitted to the fitting hole 11g so that the torsion bar 12 is supported along the width direction of the seat cushion 10. Since the torsion bar 12 is rotatably supported with the projecting plate 11b provided on the other bracket 11 at its other end portion (free end), the torsion bar 12 exhibits predetermined spring characteristics by being twisted on the free end side.

The arm 13 is provided in the vicinity of each end portion of the torsion bar 12. In one of the arms 13 arranged on the fixed end side of the torsion bar 12, its base end portion is pivotably disposed to the torsion bar 12, and in the other arm 13 arranged at the free end side of the torsion bar 12, its base end portion is connected directly to the torsion bar 12 to be enforced in the direction of falling backward (refer to FIG. 3) by its torsion torque.

The supporting frame 14 is disposed along the width direction of the seat cushion 10 between upper end portions 13a of the arms 13. The flat-type supporting member 15 is supported with the supporting frame 14 at a rear end portion 15a, and is strained in the longitudinal direction of the seat cushion 10 by being fixed to an arbitrary frame member (it should be noted that "an arbitrary frame member" in the present specification means any member including pipe members or plate members which form a basic shape and size of the seat cushion such as a side frame, a rear frame and so on, and also shaft members, metal parts, rings and so on which are attached to these pipe members and the like) arranged in front of the seat cushion 10 through a fixing portion 15c formed by folding back of a front end portion 15b.

In the present embodiment, two sheets of two-dimensional net members 15A and 15B are used in connecting both together on the way by sewing as the flat-type supporting member 15, and as the two-dimensional net member 15A arranged in the rear, the one narrower in width than the two-dimensional net member 15B arranged in front is used. Therefore, in the boundary of the two two-dimensional net members 15A and 15B, each side portion 15d of the two-dimensional net member 15B arranged in front protrudes outer side of the two-dimensional net member 15A arranged in the rear, and one end of a coil spring 16 is engaged within the protruding side portion 15d.

More concretely, a wire member 17 made of spring steel along the width direction of the seat cushion 10 is supported at the boundary end between the two-dimensional net member 15B arranged in front and the two-dimensional net member 15A arranged in the rear. The wire member 17 is used to prevent a feeling of stagger when an inertia force is affected at the time of being seated. Respective one ends of the coil springs 16 are engaged to the vicinities of both ends of the wire member 17. Since the other ends of respective coil springs 16 are engaged to the engaging rings 11e provided on respective brackets 11 as described above, respective coil springs 16 are to be disposed the outward of respective side portions of the two-dimensional net member 15A arranged in the rear finally.

Since a seated person is likely to feel the coil spring 16 as an auxiliary spring means for imparting a second function described later as something foreign when the coil spring 16 is disposed in the vicinity of the body side of the seated person, it is preferable to dispose the coil spring 16 at a position where the seated person is not likely to feel it as something foreign, for instance, as in the present embodiment, it is preferable to dispose the coil spring 16 along the longitudinal direction from a middle position in the longitudinal direction of the seat cushion 10 to the rear of the seat cushion. In addition, it is preferable to provide one end of the coil spring 16 positioned at the middle in the longitudinal direction of the seat cushion 10 in the vicinity of tuber of ischium or in the vicinity of trunk axis which corresponds to a position of barycenter of the human body at the time of being seated, so that the seated person can be excited effectively for the vibration input making use of one end of the coil spring 16 as a functional point. Therefore, it is recommendable to set the position of the wire member 17 serving as an engaged part to be engaged to one end of the coil spring 16 within a rang of 150 mm, preferably 100 mm, more preferably 50 mm when taking a barycentric position of the seated person at the time of being seated as a criterion.

The initial tension of the torsion bar 12 is adjusted so that the arm 13 locates at a state of unstable balance in the equilibrium state at the time of being seated. Accordingly, the torsion bar reacts sensitively to a minute vibration, the restoring force of the torsion bar 12 creates mainly a feeling of stroke, turns out a balancing state effectively against the displacement from no load state to an equilibrium state, and carries a vibration absorbency function and an impact force absorbency function, as a first function of the seat structure of the present embodiment. Further, the coil spring 16 differs in disposition angle between no load state and an equilibrium state, works effectively in an equilibrium state mainly, supplements its vibration absorbency function mainly in a high-frequency band, and works more effectively to a minute vibration, as a second function of the seat structure of the present embodiment. Though the minute vibration can be treated with the torsion bar 12 also, the function to the minute vibration can be further improved by arranging the coil spring 16 at a region insensitive to a feeling of something foreign as described above. Incidentally, the coil spring 16 has a function to support a seated person stably against swaying from side to side.

That is, though the present embodiment creates a feeling of stroke and makes out an unstable balancing state mainly by applying a restoring force of the torsion bar 12 as described above, since it works sensitively to a minute vibration, various characteristics such as vibration absorbency and the like required for a seat can be given sufficiently with only the torsion bar 12. Therefore, the freedom in designing a total spring structure including the coil spring 16 supplementing thereto is widen to make an optimum design possible, which results in reduction of the number of coil springs to be used, so that the reduction in weight and cost can be achieved.

Since coil springs in the vicinity of the body side which make a seated person feel something foreign can be drawn from service, which permits the thickness of a three-dimensional net member (a solid knitted fabric), urethane member and the like that is a cushion layer composing a surface layer to be thinner than the conventional manner, to reduce in number of stacked layers, and to make a distance between frames on a body side portion, namely, a frame pitch small, so as to contribute to the reduction in weight and size of the total seat structure.

It should be noted that though the wire member 17 is not required to be a spring steel, if it is not a spring steel, it will be subjected to plastic deformation when the flat-type supporting member 15 is depressed by application of a predetermined load. When the wire member 17 has high stiffness, it makes feel itself something foreign. Though it is possible to reduce the feeling of something foreign even with a wire member not to be a spring steel, by processing it into a shape imitating the human body, when a spring steel is used, it is preferable that a spring characteristic of the spring steel can be served, which helps further improvement of vibration absorbency and the like.

Figure 12:
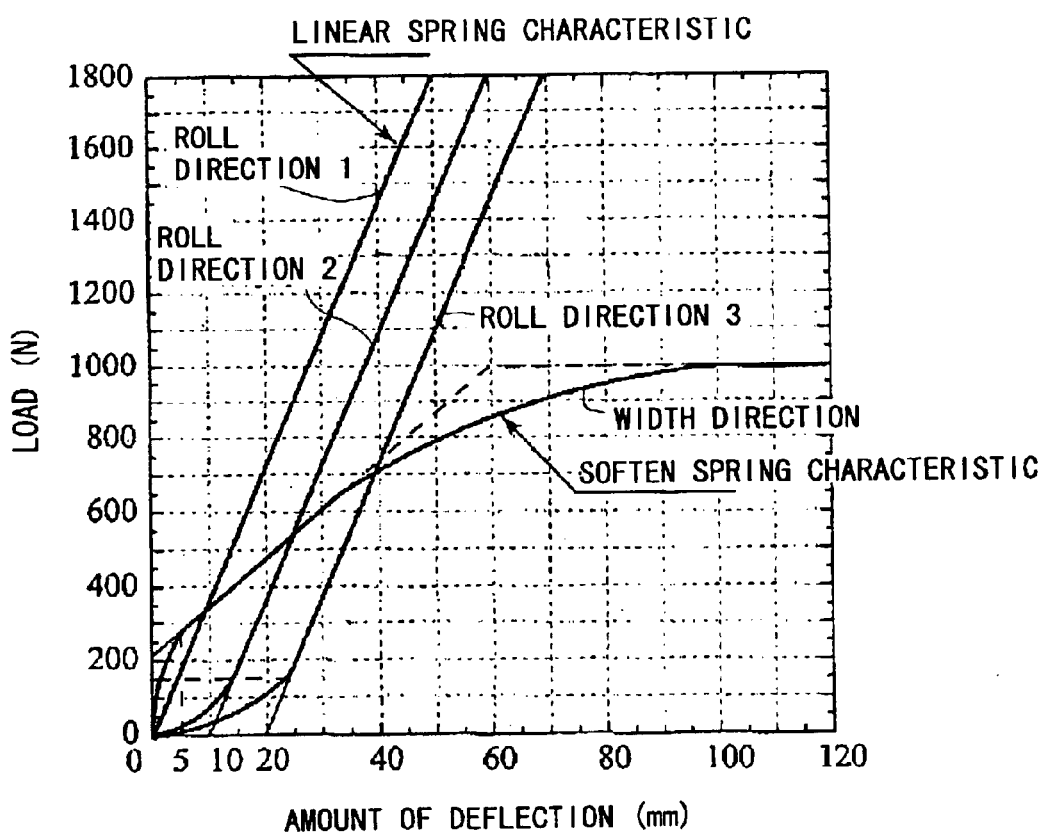
FIG. 12 is a chart showing tensile characteristics of a two-dimensional net member used for a flat-type supporting member in a test example.

Here, the two-dimensional net members 15A and 15B used as a flat-type supporting member 15 comprises elastic yarns, either one of the warp or the weft is composed of an elastic yarn such as a polyester elastomer fiber, a polyurethane fiber and so on, and the other is composed of a common yarn such as a nylon fiber, a polyester fiber or the like which has smaller elasticity than the elastic yarn. Further, when a two-dimensional member is used, as shown in FIG. 12, it is preferable to use a two-dimensional member showing a softening spring characteristic as a tensile characteristic when it is pulled along an arrangement direction of the elastic yarn, and a linear spring characteristic as a tensile characteristic when pulled along an arrangement direction of the common yarn. When the common yarn is broken as a big load is inputted, it is possible to raise a damping ratio depending on the softening characteristic. It should be noted that, as shown in FIG. 12, it is possible to make a structure having a characteristic without a non-linear characteristic at all as shown in a roll direction 1, as a linear spring characteristic when pulled in a roll direction of a raw fabric which is an arrangement direction of a common yarn by selecting material of a common yarn or by selecting a diameter of the wire and the like. It is also possible to make a structure having a non-linear characteristic in an initial deflection region (normally a region of 10 mm or less in a deflection amount (the roll direction 2), and a region of 20 mm or less in a deflection amount at maximum (the roll direction 3). It is possible to increase a feeling of stroke at the time of being seated by making a structure having a non-linear characteristic in the initial deflection region. Incidentally, the tensile characteristic shown in FIG. 12 is a characteristic obtained as follows. The above-described two-dimensional net member is cut in a size of 200 mm in length and 50 mm in width for a test piece. From both longitudinal ends toward the center of the test piece by 50 mm are clamped by a tensile strength test equipment and the above test piece is pulled in the longitudinal direction at a speed of 50 mm/min to measure the tensile characteristic. At this time, for a tensile characteristic along the arrangement direction of the elastic yarn, the test piece to be used is cut out in a manner that the arrangement direction of the elastic yarn corresponds to the longitudinal direction of the test piece, while for a tensile characteristic along the arrangement direction of the common yarn, the test piece to be used is cut out in a manner that the arrangement direction of the common yarn corresponds to the longitudinal direction of the test piece.

Moreover, it is possible to use a three-dimensional net member (a solid knitted fabric) or a urethane member as the flat-type supporting member 15, not limiting to such a two-dimensional net member. A flat-type supporting member 15 in the present embodiment is usually not used as a cushioning layer for a surface layer as it is, it is used in a manner that a cushioning layer as a surface layer such as a three-dimensional net member (a solid knitted fabric) or a urethane member arranged to hide respective frames such as a side frame and the like from sight is separately layered on the flat-type supporting member 15. That is, the flat-type supporting member 15 of the present embodiment is usually used as that composing a cushioning layer for a base layer. Accordingly, the flat-type supporting member 15 bears a role as a spring structure such as vibration absorbency and impact absorbency and so on, supporting a three-dimensional net member (a solid knitted fabric) or a urethane member, so a two-dimensional net member is usually used as in the present embodiment. However, it is also possible to use a solid knitted fabric or a urethane member. Needless to say, it is possible to use by stacking a solid knitted fabric or a urethane member on a two-dimensional net member, or stacking a urethane member on a solid knitted fabric, or to make a structure by replacing, for instance, only the two-dimensional net member 15B arranged in front with a solid knitted fabric and the like, out of the two-dimensional net members 15A and 15B used by dividing it into two of front and back portion in the present embodiment.

It is preferable for the flat-type supporting member 15 to have a nearly-vertical load-deflection nearly similar to or lower than the load-deflection characteristic of muscles in the human body in a state being strained between the above-described frame 14 and any frame member disposed in front, in any case whether any one kind among a two-dimensional net member, a three-dimensional net member (a solid knitted fabric), or a urethane member is used as the flat-type supporting member 15, or any two kinds or more of the above members are used in mixture by stacking, sewing, or vibration welding. Thereby, a reaction force is small, deformation of muscles in a seated person can be suppressed, and a feeling of fitting can be increased in reduction of a feeling of stagger. Incidentally, a three-dimensional net member (a solid knitted fabric 9 is prepared by connecting two front and back layers of ground knitted fabric with connection thread made of monofilament and the like in a cross or in a truss.

Further, it is possible to create various characteristics by suitably selecting the flat-type supporting member 15 to be used in such a manner that a structure that easily causes depression and puts more emphasis on body pressure dispersing ability, and posture supportability can be prepared by using the flat-type supporting member 15 provided with a further softer spring characteristic among the ones having substantially similar load-deflection characteristic of muscles in the human body or lower in characteristic, or a structure putting more emphasis on reduction of a feeling of stagger and vibration absorbency can be prepared by using the flat-type supporting member 15 having a spring characteristic rather stiff. Further, when using two sheets of materials in front and behind being connected by sewing or by vibration welding as in the present embodiment, it is possible to use members having different spring characteristics or damping characteristics from each other, irrespective of materials of the same kind or different kinds.

In the seat structure of the present embodiment at the time of no load before a person takes a seat, the arm 13 takes substantially a vertical state as shown by a solid line in FIG. 3, and a portion excluding the vicinity of the front end portion 15b of the flat-type supporting member 15 is strained in nearly horizontal. When a person takes a seat in such a state, the vicinity of boundary of two two-dimensional net members 15A and 15B in the flat-type supporting member 15 corresponding to a barycentric position of the person is depressed. Then, the arm 13 pivots in the direction of falling forward against an elastic force of the torsion bar 12, pulled by the two-dimensional net member 15A arranged in the rear. The pivoting angle at this time differs depending on a weight of a seated person. Therefore, the vibration absorbency by a spring characteristic of the torsion bar 12 does not differ largely by the difference in weight (difference in physique) and exhibits nearly stable vibration absorbency. Furthermore, since the coil spring 16 elongates with depression of the two-dimensional net members 15A and 15B composing the flat-type supporting member 15 at the vicinity of the boundary therebetween, its spring characteristic also functions to supplement the vibration absorbency by the torsion bar 12. Further, a seated person is supported against sway from side to side by its spring characteristic to suppress a stagger.

When the barycentric position is changed by changing in posture of a seated person from a standard posture to a sacrum posture as described above, a position of depression in the flat-type supporting member 15 changes, and a pivoting angle in the direction of falling forward of the arm 13 is changed accompanied by this. Therefore, since movement of the body is easy, deformed shape of the flat member 15 due to a load follows a posture of a seated person, and does not damage a feeling of fitting with a seated person, it is possible to suppress worsening of a sitting comfort caused by coming out of posture difference. In a seat of an automobile, even when a seated person takes a sacrum posture as above, difference in vibration absorbency due to the torsion bar 12 caused by difference of a posture is made small, and substantially stable vibration absorbency can be displayed.

On the other hand, when an impulsive load or vibration larger than predetermined magnitude is inputted by collision and the like, an amount of depression of the flat-type supporting member 15 at the position corresponding to the vicinity of the tuber of ischium which is a barycentric position in a standard posture becomes large. Accordingly, the arm 13 tends to pivot in the direction of falling forward further against the elastic force of the torsion bar 12, but it can not pivot more than predetermined because of abutting on the plate rubber 11f of the bracket 11 while being buffered by its spring characteristic, so that the pivoting angle is controlled to restrict depression of a seated person to a degree within the necessity when the impact force is inputted. When pivoting of the torsion bar 12 is controlled, the vicinity of tuber of ischium is further depressed by elongating the flat-type supporting member 15 subsequently, so that the leg portion is lifted upward, which results in generation of a rotational moment around the vicinity of the tuber of ischium. As a result, a force enforcing to alienate the human body from the seat surface is suppressed, the back of the human body is pressed against the seat back, so that impact applied on the human body is effectively reduced. It should be noted that in order to display such a function more effectively, it is preferable for the flat-type supporting member to raise the damping ratio when the flat-type supporting member 15 is elongated in the strain direction. For instance, when it is a two-dimensional net member, a member having a characteristic as shown in FIG. 12 is used and it is preferable to provide it so that a common yarn is broken at the time of a large load being inputted. As a result, a softening spring characteristic of an elastic yarn functions largely, in which even when the amount of displacement increases, the spring constant becomes small, so that the damping ratio goes up and the impact absorbency can be further improved.

Figure 4:
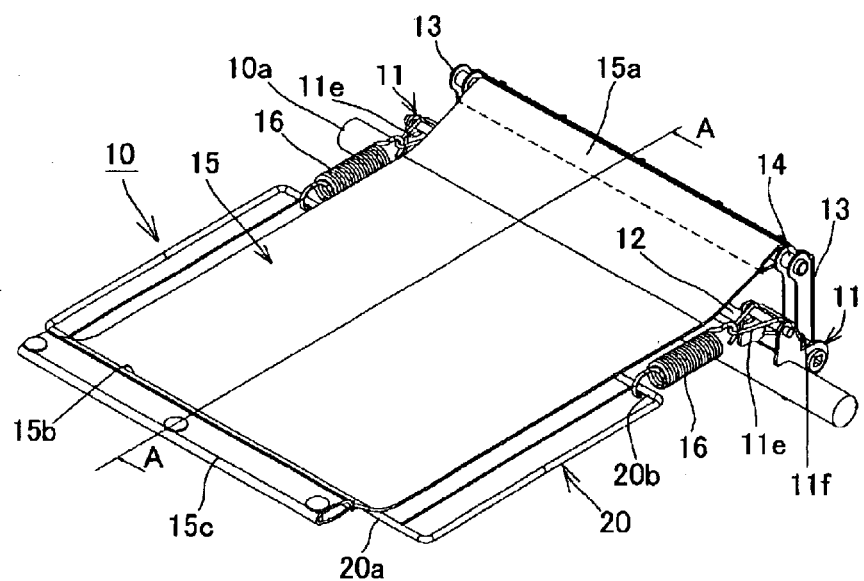
FIG. 4 is a schematic perspective view showing a seat cushion composing a seat structure according to another embodiment of the present invention.
Figure 5:
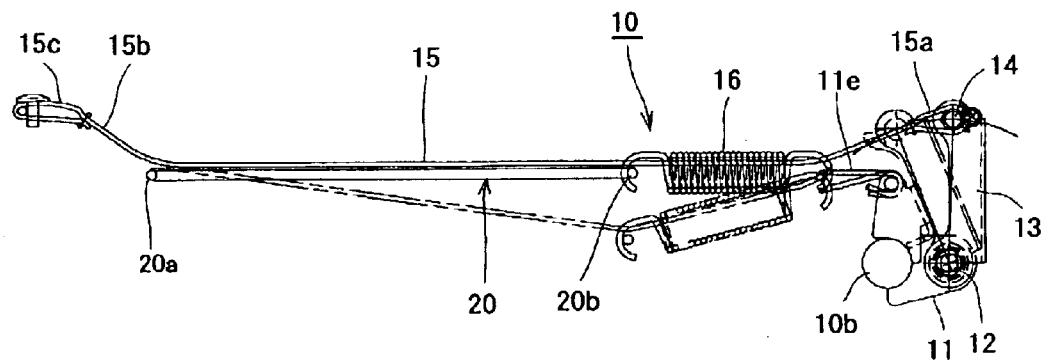
FIG. 5 is a sectional view taken along the line A—A in FIG. 4.
Figure 6:
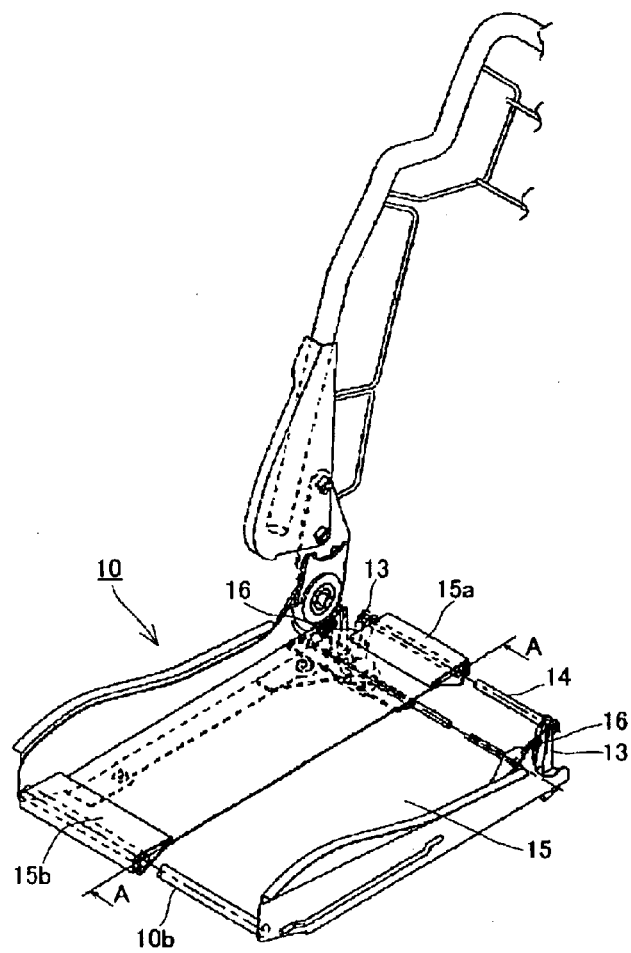
FIG. 6 is a schematic perspective view showing a seat structure according to still another embodiment of the present invention.
Figure 7:
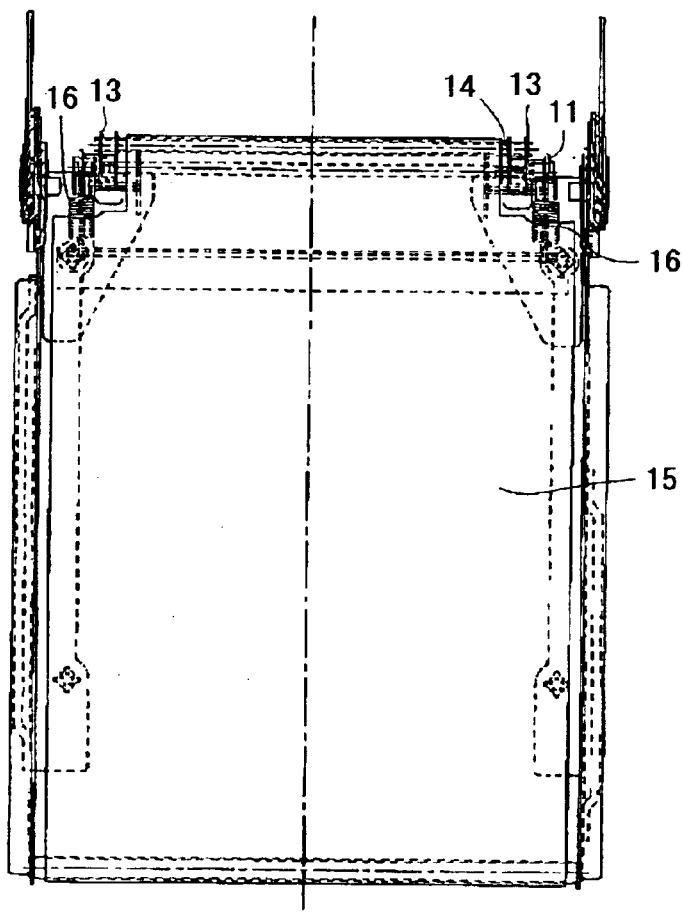
FIG. 7 is a plan view of the seat cushion composing a seat structure according to the above-described embodiment.
Figure 8:
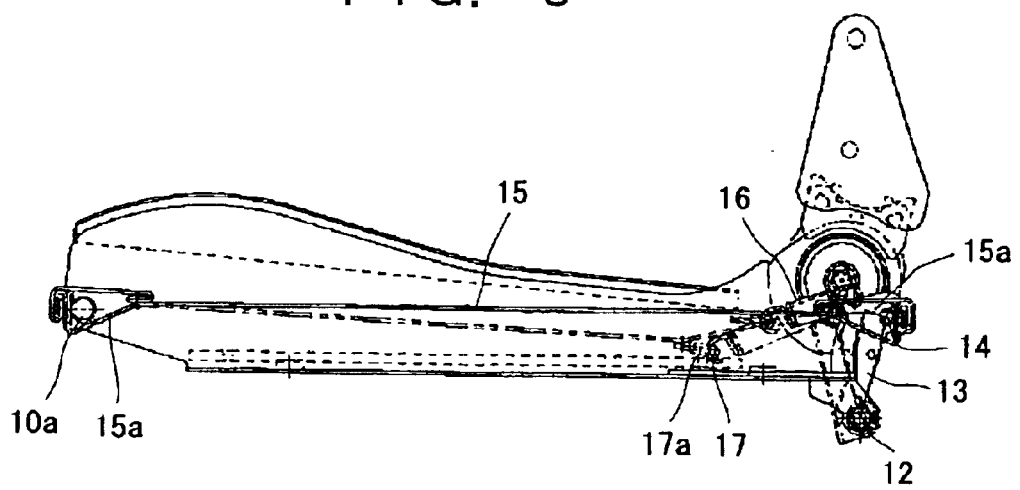
FIG. 8 is a sectional view taken along the line A—A in FIG. 6.

It should be noted that in the above-described embodiment, a flat-type supporting member 15 is composed of two-dimensional net members 15A and 15B connecting two sheets thereof by sewing, but it is of course possible to provide a flat-type supporting member 15 composed of one sheet of two-dimensional net member, a solid knitted fabric, or the like between the supporting frame 14 and an arbitrary front frame member as an embodiment shown in FIG. 4 and FIG. 5. Further as shown in these figures, in place of the above-described wire member 17 engaged to the coil spring 16 at an end thereof, it is possible to arrange a flat-type elastic member 20 such as Plumaflex and the like at a lower portion of the flat-type supporting member 15. In this case, it is possible to use in that a front wire portion 20a of the flat-type elastic member 20 is supported pivotably with a member such as an arbitrary frame and the like arranged near in front composing the seat cushion, and an end of the coil spring 16 is engaged to a rear wire portion 20b.

Figure 9:
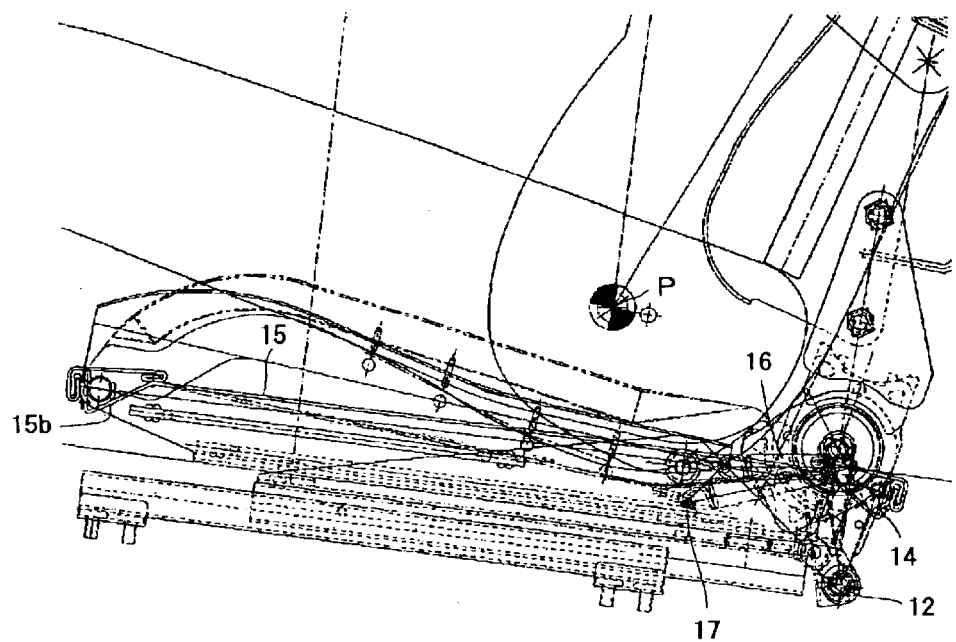
FIG. 9 is a view showing a positional relationship between a barycentric position at the time of being seated and a functional end of the coil spring.

Furthermore, as in an embodiment shown in FIG. 6 to FIG. 9, it is possible to prepare a seat structure in which an integral-type flat-type supporting member 15 which is supported with the supporting frame 14 supported with the arm 13 at the rear end portion 15a, and supported with a front end frame 10b composed of a pipe member arranged in front of the seat cushion 10 at the vicinity of the front end portion 15b is used, and at the same time, a wire supporting member 17a is sewed or vibration-welded substantially in a cylindrical shape, on a middle position in its longitudinal direction and corresponding to a barycentric position of the human body. The wire member 17 is inserted through the wire supporting member 17a, which supports one end of the coil spring 16. It should be noted that though the other end of the coil spring 16 is engaged to the bracket 11 without passing through the engaging ring in this embodiment, it is similarly recommendable as in the above-described respective embodiments to set an end of the coil spring 16 serving as a functional end, which is engaged to the wire member 17 movable substantially in a vertical direction by being applied a load, within a range of 150 mm, preferably 100 mm, more preferably 50 mm when taking a barycentric position P of the seated person as shown in FIG. 9. Other structure is nearly equal to respective embodiments described above.

Figure 10:
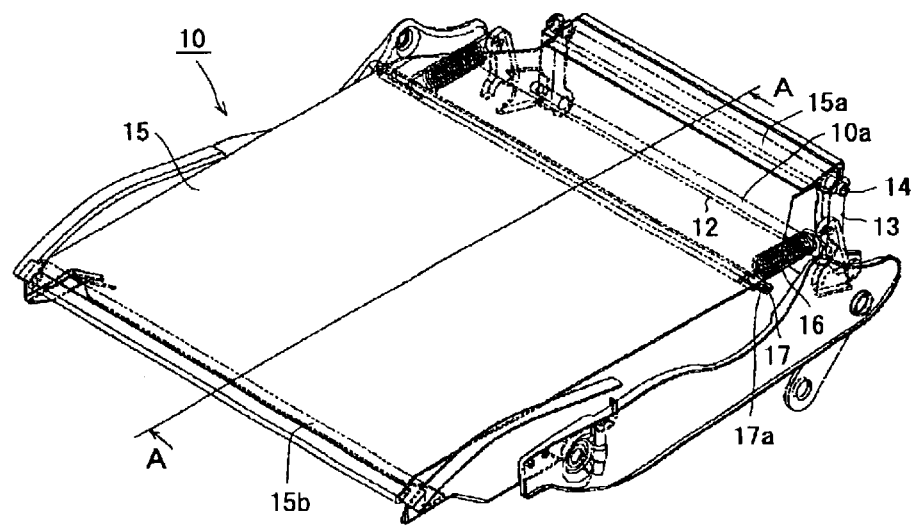
FIG. 10 is a schematic perspective view showing a seat cushion constituting a seat structure according to yet another embodiment of the present invention.
Figure 11:
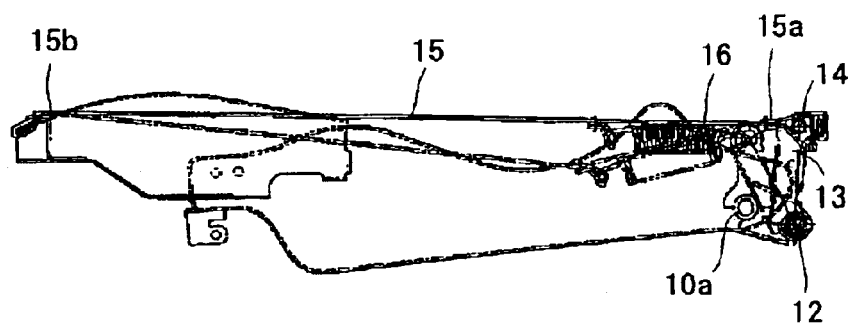
FIG. 11 is a sectional view taken along the line A—A in FIG. 10.

Further, in an embodiment shown in FIG. 10 and FIG. 11, the vicinity of a front end portion 15b of a flat-type supporting member 15 is engaged to a plate-like front end frame 10b arranged in front of a seat cushion 10, and a rear end frame 10a is applied as a stopper member to control the range of pivoting in the direction of falling forward of an arm 13. The embodiment has a structure substantially the same as the embodiment shown in FIG. 6 to FIG. 9 in other points.

Respective embodiments shown in FIG. 6 to FIG. 9, and FIG. 10 and FIG. 11 are shown as variations of structures or mounting structures of the flat-type supporting member 15, the wire member 17, the arm 13, the stopper member and so on, and their functions and effects are the same as those in respective embodiments.

In the seat structure shown in FIG. 1, a two-dimensional net member is used as the flat-type supporting member 15, and a three-dimensional net member (a solid knitted fabric) as a cushion layer (cushioning member for a seat cushion) forming a surface layer is strained between side frames forming the seat cushion 10 at a percentage of elongation of 5% or less. The two-dimensional net member used for this test has tensile characteristics in the arrangement direction of an elastic yarn (in the width direction of the raw fabric) and in the arrangement direction of a common yarn (in the roll direction of the raw fabric) shown in FIG. 12, while in the arrangement direction of the elastic yarn, there provides a characteristic of a softening spring. Incidentally, the tensile characteristic in the arrangement direction of the common yarn is a characteristic corresponding to a roll direction 2 in FIG. 12. The direction of arrangement of the elastic yarn generating the softening spring characteristic is along the longitudinal direction of the seat cushion 10.

The three-dimensional net member (solid knitted fabric) used is obtained such that in a Double Raschel knitting machine having 14 gauge and a bed gap of 15 mm, using 6 sheets of reeds from L1 to L6, polyethylene terephthalate fiber false twist yarn of 835 decitex 240 filaments is supplied from two sheets of reeds (L1 and L2) forming a ground knitting fabric of a surface layer to an L1 guide in an arrangement of 2 in 2 out and to an L2 guide in an arrangement of 2 out 2 in, polyethylene terephthalate fiber false twist yarn of 501 decitex 144 filaments is supplied from two sheets of reeds (L6 and L7) forming a ground knitting fabric of a back layer to a guide in an arrangement of all in, polytrimethylene terephthalate monofilament of 390 decitex (diameter 0.19 mm) is supplied from two sheets of reeds (L3 and L4) forming a connecting yarn to an L3 guide in an arrangement of 2 in 2 out, to an L4 guide in an arrangement 2 out 2 in. Thus, a gray of a solid knitted fabric in a knit structure shown as below is prepared in a density of yarn feeding 13 course/2.54 cm, which is further heat set at 150° C. for one minute to obtain the solid knitted fabric. The fabric structure of this solid knitted fabric is 9.5 mm in thick, 925 g/m² in weight, and has a fabric density of 14 course/inch, 13 wale/inch, the number of connecting yarns per unit area of 364/6.45 cm².

Fabric Structure

L1: 4544/2322/1011/3233/
L2: 1011/3233/4544/2322/
L3: 3245/2310/2310/3245/
L4: 2310/3245/3245/2310/
L5: 1110/0001/
L6: 2210/2234/

Figure 13:
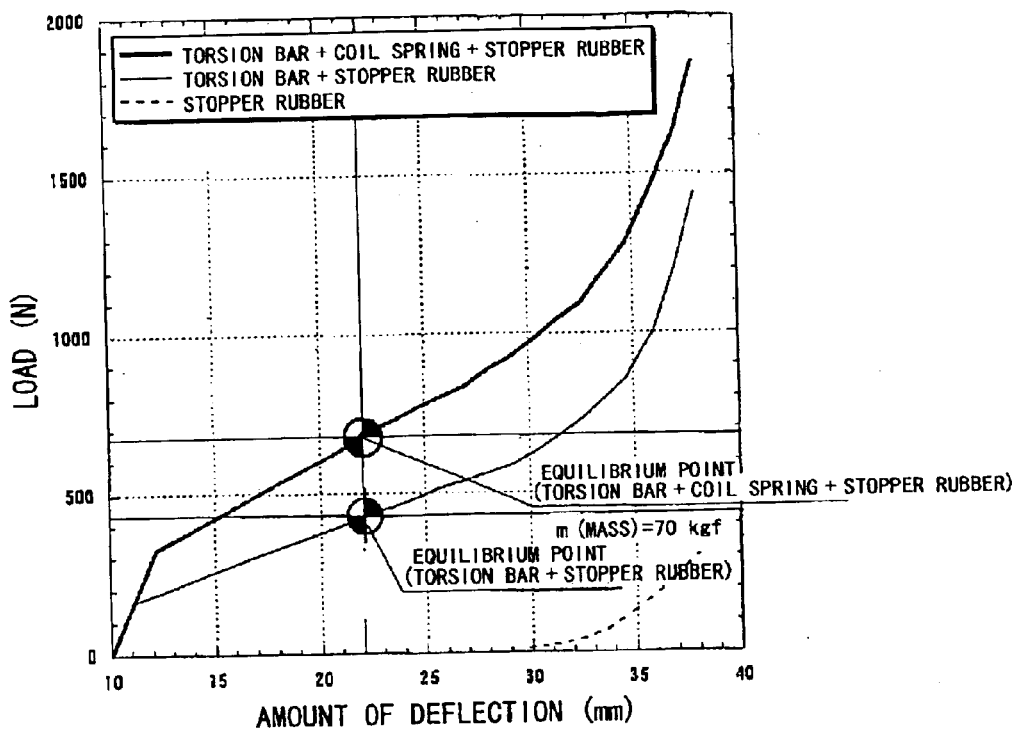
FIG. 13 is a view showing spring characteristics of a torsion bar, a coil spring, and a plate rubber (stopper rubber) used in the text example.

The spring characteristics of the torsion bar, coil spring which are used for the test and the plate rubber (referred to as a "stopper rubber") which serves as a stopper member are as shown in FIG. 13. The bold solid line in the figure indicates a spring characteristic when all of the torsion bar, coil spring, and plate rubber are combined, while the thin solid line indicates a spring characteristic when the torsion bar and the plate rubber are combined, and all have a weak non-linear characteristic. The broken line is a spring characteristic of the plate rubber (stopper rubber) alone. Incidentally, "deflection" in FIG. 13 is an amount of horizontal displacement of the supporting frame 14 which is supported with the arm 13 enforced with the torsion bar 12.

Figure 14:
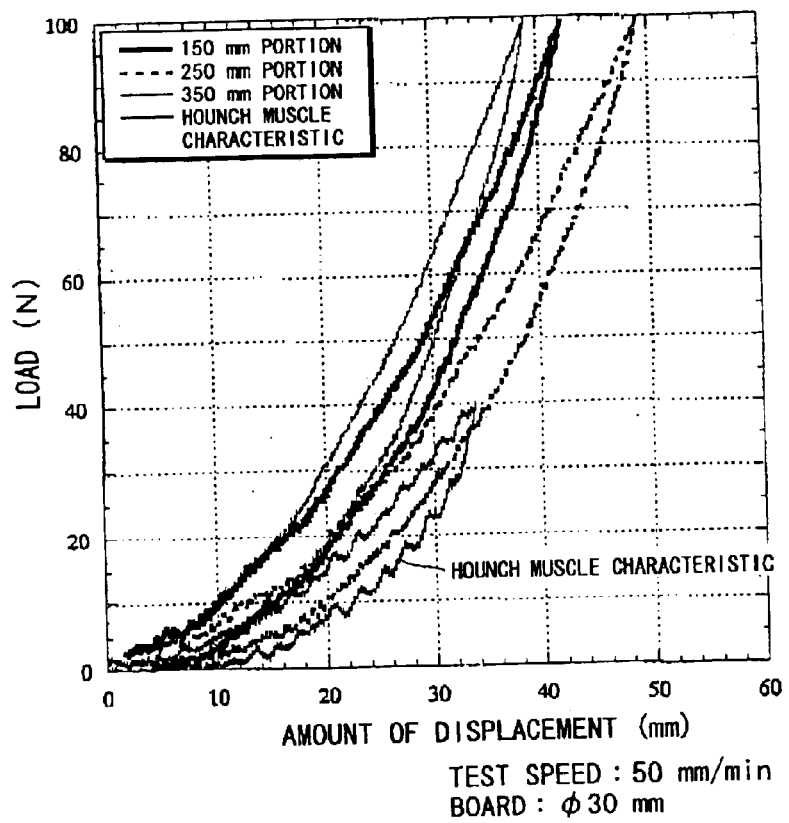
FIG. 14 is a view showing load-deflection characteristics obtained by measuring a test sample of a seat structure in a state of connecting no solid knitted fabric using a compressed board having a diameter of 30 mm.
Figure 15:
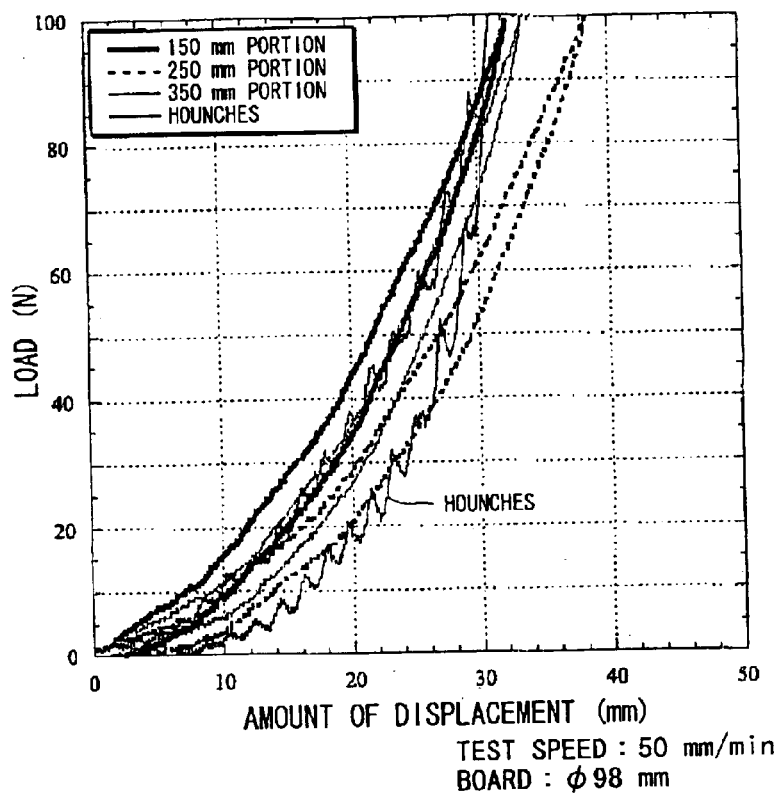
FIG. 15 is a view showing load-deflection characteristics obtained by measuring the test sample of the seat structure in a state of connecting no solid knitted fabric using a compressed board having a diameter of 98 mm.
Figure 16:
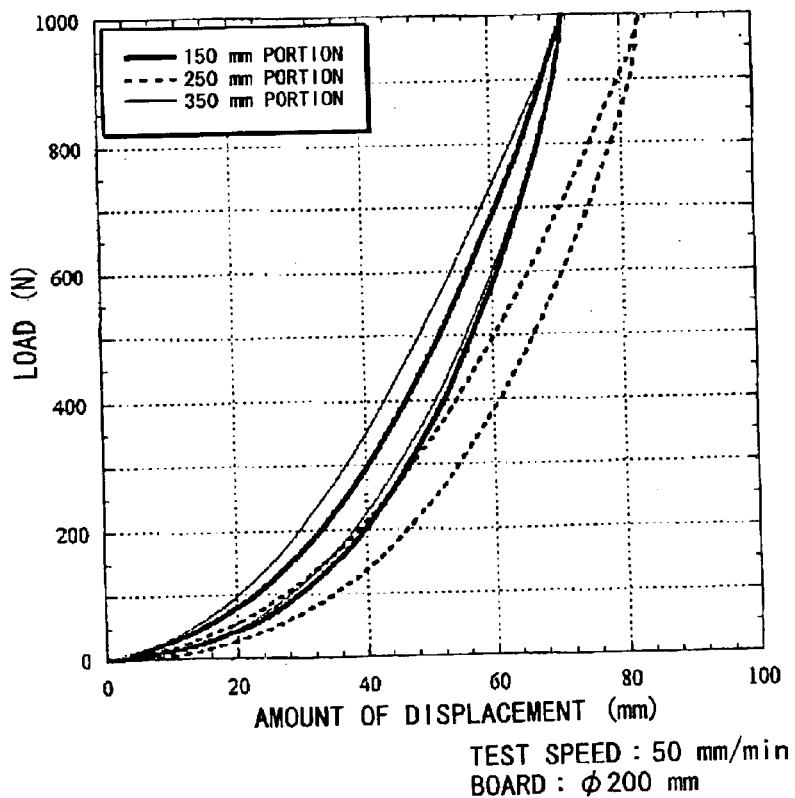
FIG. 16 is a view showing load-deflection characteristics obtained by measuring the test sample of the seat structure in a state of connecting no solid knitted fabric using a compressed board having a diameter of 200 mm.

First, a load-deflection characteristic substantially in vertical direction of strained two-dimensional net member was measured in a state without disposing the solid knitted fabric. The results were as shown in FIG. 14 to FIG. 16. The load-deflection characteristic was measured, in a state that the two-dimensional net member was strained as shown in FIG. 1, using boards for press of 30 mm, 98 mm, and 200 mm in diameter in substantially vertical direction, adjusting the center of the boards to positions indicated in respective drawings, and substantially central portion in the width direction of the seat cushion 10, from the boundary between the seat back which is a rear end of the seat cushion 10.

Figure 17:
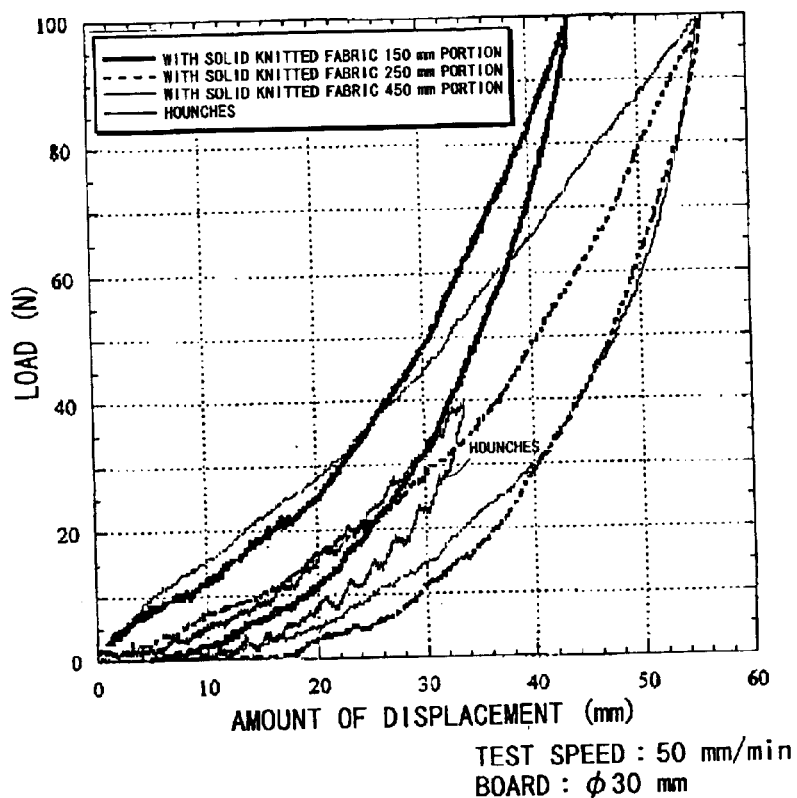
FIG. 17 is a view showing load-deflection characteristics obtained by measuring the test sample of the seat structure in a state of connecting a solid knitted fabric using a compressed board having a diameter of 30 mm.
Figure 18:
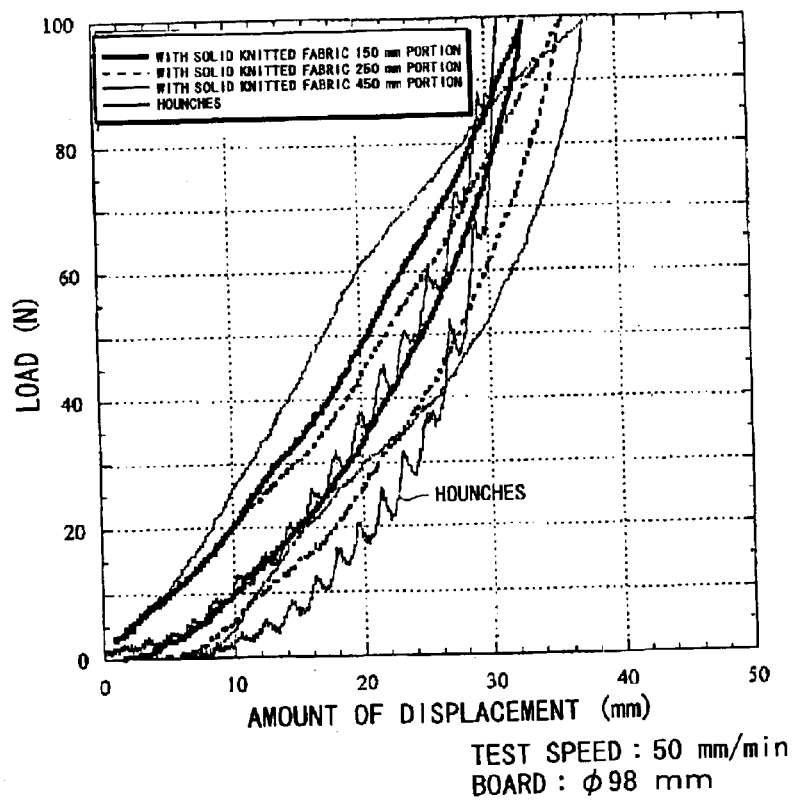
FIG. 18 is a view showing load-deflection characteristics obtained by measuring the test sample of the seat structure in a state of connecting a solid knitted fabric using a compressed board having a diameter of 98 mm.
Figure 19:
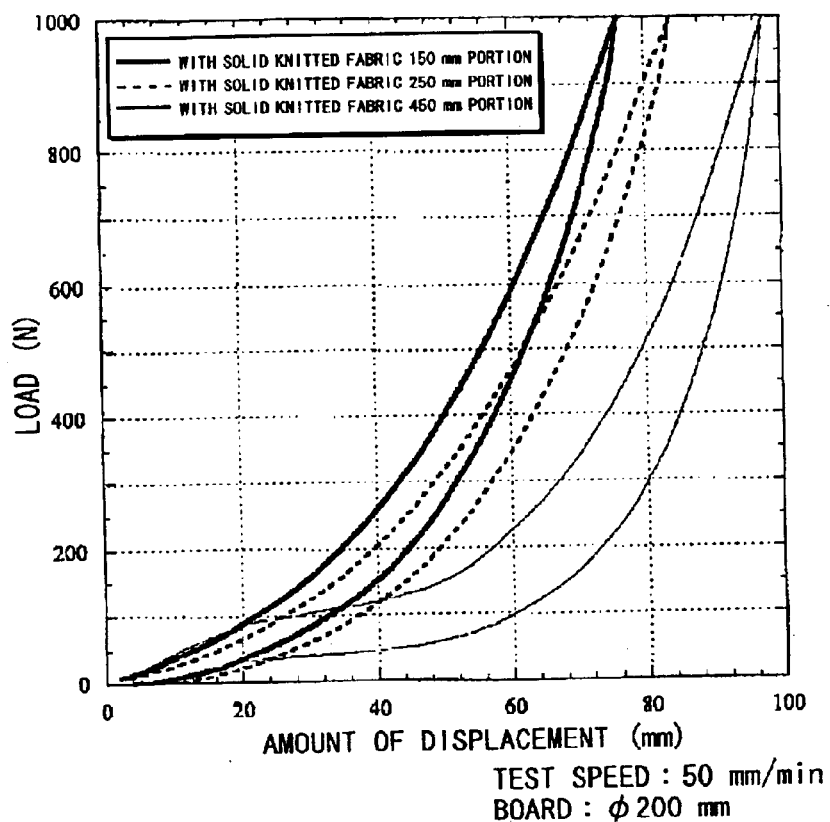
FIG. 19 is a view showing load-deflection characteristics obtained by measuring the test sample of the seat structure in a state of connecting a solid knitted fabric using a compressed board having a diameter of 200 mm.

Further, a load-deflection characteristic substantially in vertical direction was measured using the boards having 30 mm, 98 mm, and 200 mm in diameter similarly as above, in a state of the solid knitted fabric strained between the side frames at a percentage of elongation of 5% or less. The result will be shown in FIG. 17 to FIG. 19.

As clear from the comparison between FIG. 14 to FIG. 16 and FIG. 17 to FIG. 19, it is found that a hysteresis loss becomes large and a damping property is enhanced in each case of the board used when the solid knitted fabric is provided. In the load-deflection characteristics (FIG. 14, FIG. 15, FIG. 17 and FIG. 18) using the boards of 30 mm and 98 mm in diameter, load-deflection characteristics of the haunch muscles in the human body are shown together, and it is found that the two-dimensional net member used has a characteristic similar to the inclination of the load-deflection characteristic of the muscle. It is also found that when the solid knitted fabric is mounted, its spring constant becomes a little lower than the load-deflection characteristic of the muscle as a whole.

As clear from this result, the seat structure of the test example has a characteristic in which the two-dimensional net member supported elastically with the torsion bar has a characteristic close analogous to the muscle in the human body, the reaction force is small, and deformation of the muscle in a seated person can be suppressed. That is, in a low frequency band, it gets a relax state owing to an effect of autonomic nervous system, especially owing to an effect of parasympathetic nervous system so that the muscles get soft. The seat structure of the test example includes a structure having a spring constant which does not cancel this damping characteristic of the muscle. Further when the solid knitted fabric is disposed, it is possible to display the characteristic more prominently.

Figure 20:
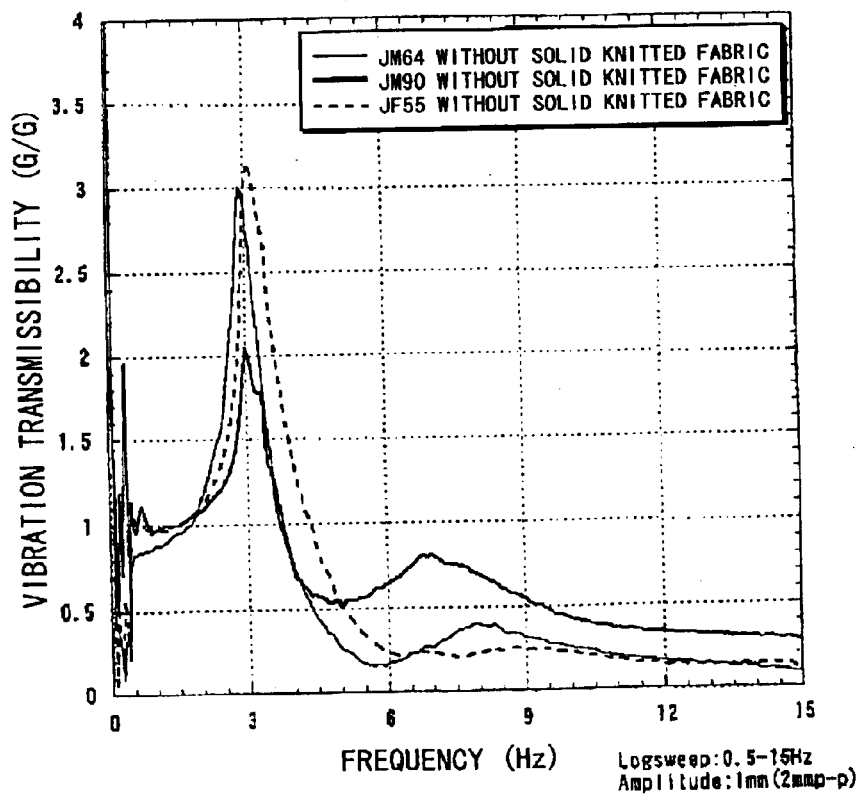
FIG. 20 is a view showing vibration transmissibility of a test sample of the seat structure in a state of connecting no solid knitted fabric.

Next, in the seat structure of the test example, a Japanese woman of 55 kg in weight (JF55), and Japanese men of 64 kg, 90 kg in weight (JM64, JM90 respectively) take seat in a state of no solid knitted fabric disposed, vibration of amplitude 1 mm (2 mm of distance between the peaks (p-p)) is applied, to measure the vibration characteristic. The results are shown in FIG. 20. It is known that what largely affects a riding comfort is shaking in a longitudinal vibration of 2 Hz or less and a vertical vibration of 5 Hz, shaking the skeletal frame itself by a vertical vibration. The resonant peak of the seat structure of the test example was off from both of these ranges and possessed an extremely low vibration transmissibility in a frequency band of 6 to 8 Hz which is resonant with the internal organs and in a frequency band of the vicinity of 5 Hz. Accordingly, by using the torsion bar, and further by arranging the coil spring along the longitudinal direction of the seat cushion, high vibration absorbency can be displayed, irrespective of smaller pieces of the coil springs used, and positions not likely to be felt as something foreign for a seated person compared to the conventional case of supporting by disposing the coil spring in the vicinity of the body side.

Figure 21:
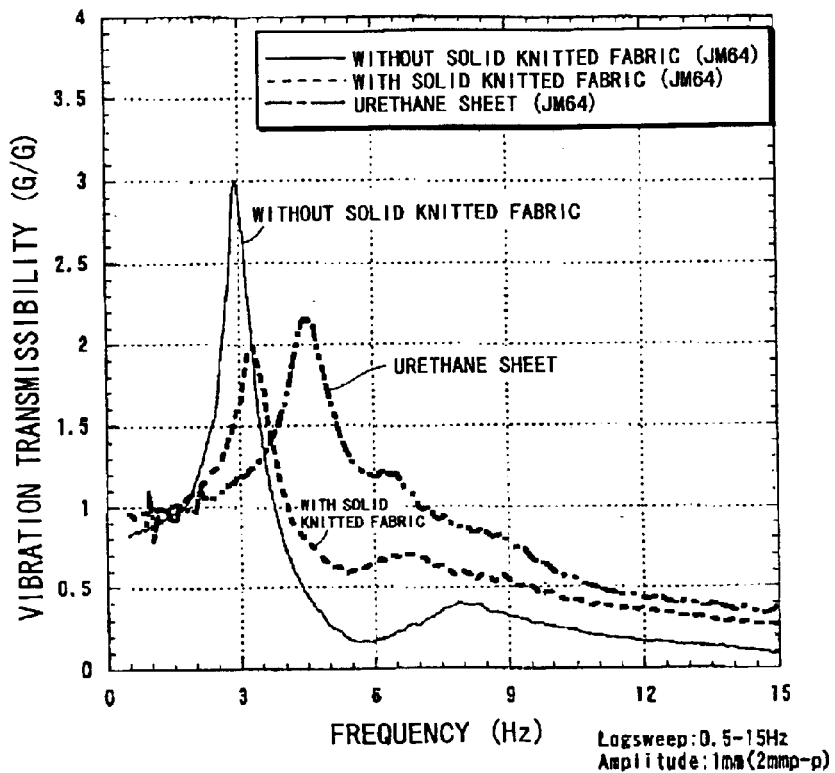
FIG. 21 is a view showing vibration transmissibility of the test samples of the seat structure in a state of connecting no solid knitted fabric and in a state of connecting a solid knitted fabric, and vibration transmissibility of a urethane sheet.

Further, in the seat structure of the test example, in a state of disposing the solid knitted fabric, the above-described Japanese man of 64 kg in weight takes seat and vibration of amplitude 1 mm (2 mm of distance between peaks (p—p)) is applied, to measure the vibration characteristic. In addition, vibration characteristic was measured similarly for a seat structure (urethane seat) having a seat cushion in which a letter S-shaped spring supports polyurethane foam of 100 mm in thickness, for the purpose of comparison. The result is shown in FIG. 21. Incidentally, the date of JM64 in FIG. 20 is shown together in FIG. 21.

As clear from this result, the vibration transmissibility in the vicinity of 3 Hz, which was high in a state of disposing no solid knitted fabric is found to become small by adding the damping property of the solid knitted fabric. Further, it is found that, in the comparison with the urethane sheet, especially the vibration transmissibility around 6 to 8 Hz, which is resonant with the internal organs and the vicinity of 5 Hz is largely reduced in the case of the seat structure of the test example.

Figure 22:
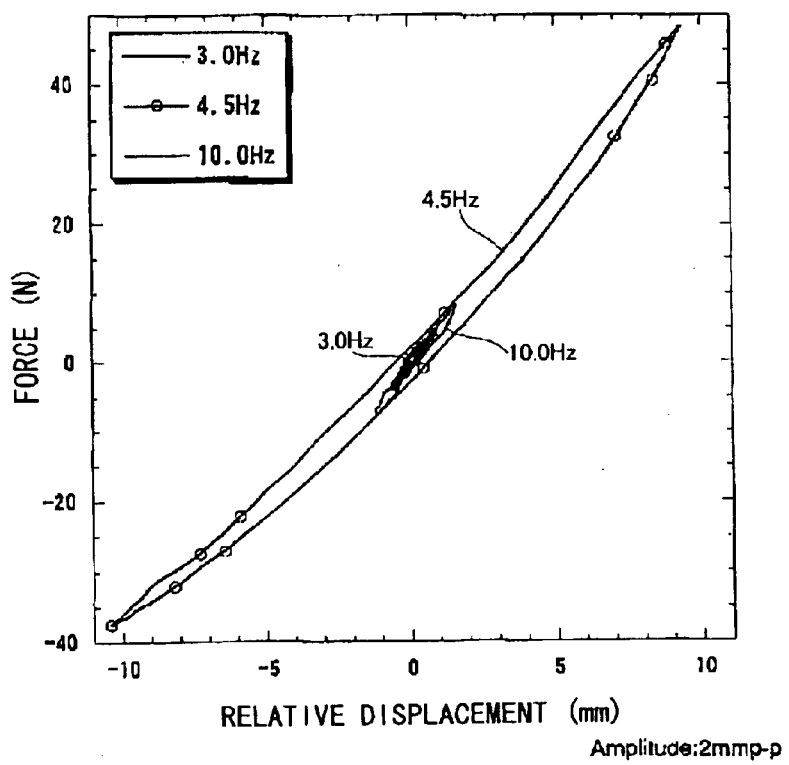
FIG. 22 is a Lissajous figure showing the relations between force and relative displacement of the test sample of the seat structure in a state of connecting no solid knitted fabric.
Figure 23:
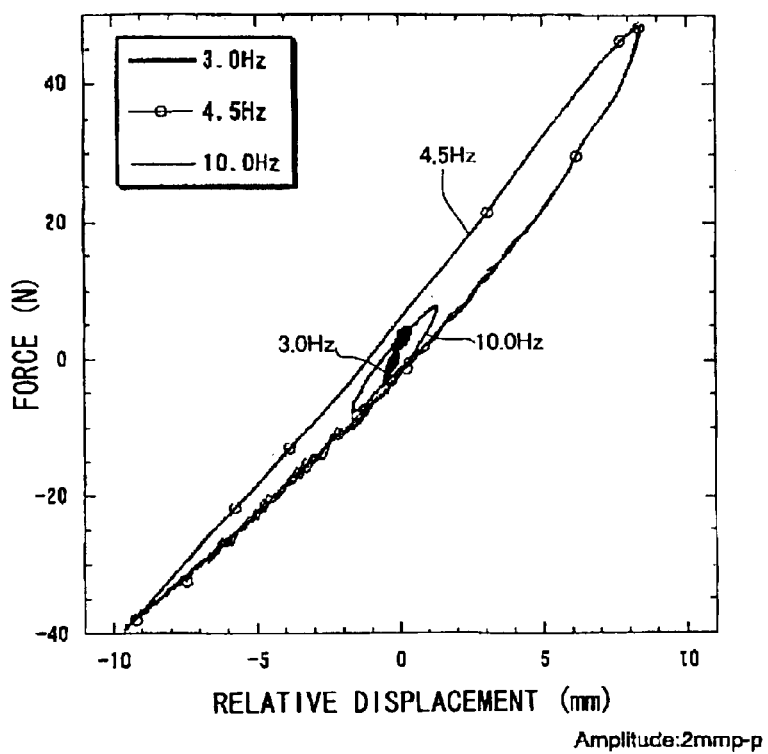
FIG. 23 is a Lissajous figure showing the relations between force and relative displacement of the test sample of the seat structure in a state of connecting a solid knitted fabric.

For reference purposes, about the seat structure of the test example, a Lissajous figure showing relations between force and relative displacement in a state of disposing no solid knitted fabric and in a state of disposing the solid knitted fabric while mounting a mass of 6.7 kg shows that the structure disposing the above-described solid knitted fabric is certainly higher in damping ratio as shown in FIG. 22 and FIG. 23. Accordingly, it is possible to provide a more preferable seat structure by supporting the two-dimensional net member which is a flat-type supporting member through the torsion bar, and by combining the above-described solid knitted fabric.

Figure 24:
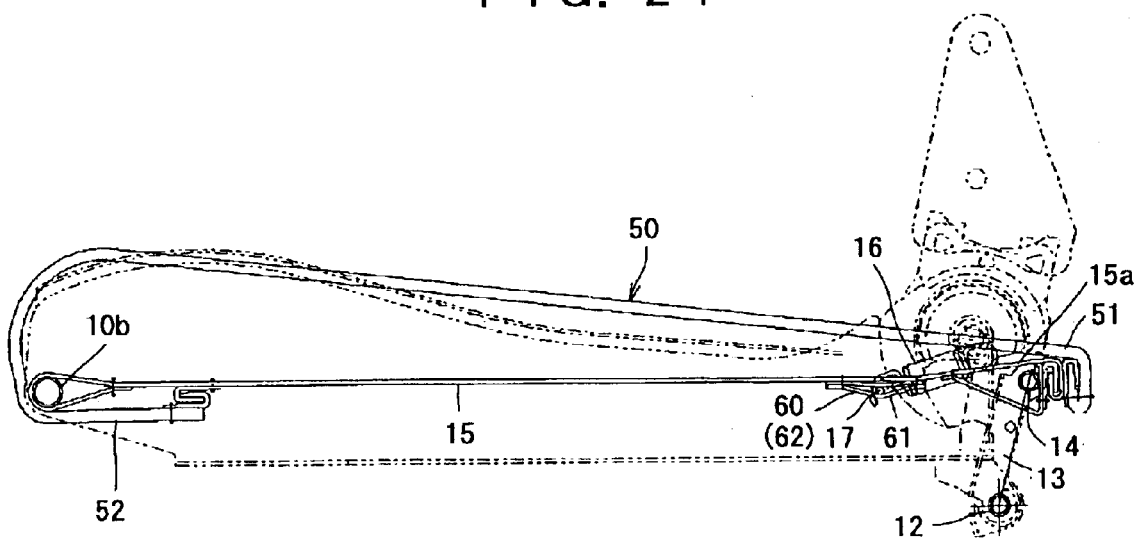
FIG. 24 is a schematic side view showing a seat cushion in a state of no load, which composes a seat structure relating to yet another embodiment of the present invention.

It should be noted that, needless to say, the seat structure of the present invention is not limited to the embodiments described above. For instance, it is possible to make a structure that a cushioning member 50 for the seat cushion disposed above the flat-type supporting member 15 is not engaged to the side frame, but a rear end portion 51 thereof is supported with the supporting frame 14 which is elastically supported by the torsion bar 12 through the arm 13, together with the rear end portion 15a of the flat-type supporting member 15 as shown in FIG. 24. In this case, it is structured that a front end portion 52 of the cushioning member 50 for the seat cushion is engaged to the front end frame 10b or engaged to the flat-type supporting member 15, allowing the front end portion 52 to pass through under the front end frame 10b as shown in FIG. 24.

Figure 25:
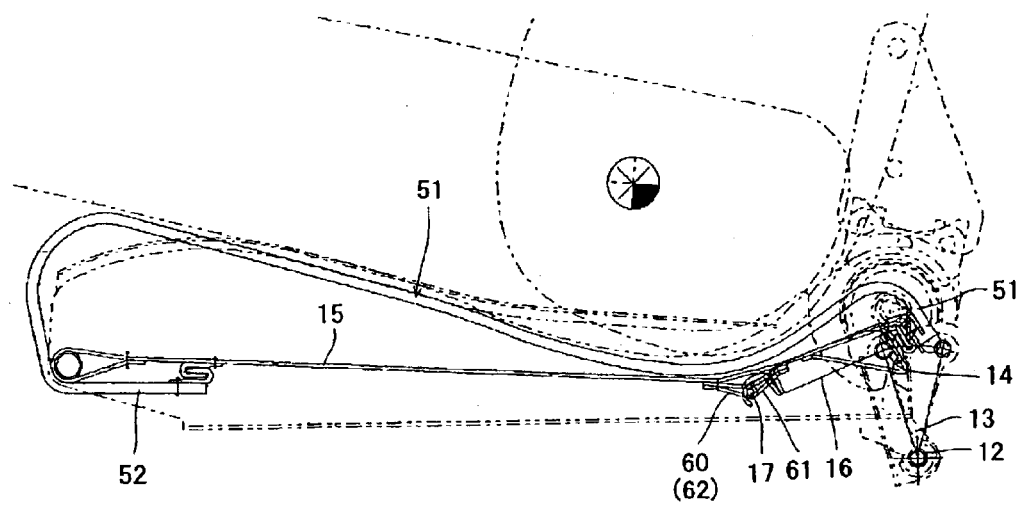
FIG. 25 is a schematic side view showing the seat structure in FIG. 24 in a seating state of a person.

The cushioning member 50 for the seat cushion is strained lest it should loosen at the time of no load as shown in FIG. 24. With this structure, while the outside appearance is not damaged at the time of no load, since the arm 13 and the supporting frame 14 fall forward as shown in FIG. 25 when a person takes seat, the tension of the cushioning member 50 for the seat cushion comes loose. As a result, the spring characteristic in the direction of the normal (in the thickness direction) possessed by the cushioning member 50 for the seat cushion is enforced to work effectively to further reduce the vibration transmissibility thereof. Therefore, the vibration absorbency can be further improved. It should be noted that as for the cushioning member 50 for the seat cushion, a three-dimensional net member (a solid knitted fabric), a urethane material, a two-dimensional net member and so on can be used, and plurality of these members can be used in layers. However, it is preferable to use a solid knitted fabric which has a sufficient cushioning property even it is a thin type.

As shown in FIG. 24 and FIG. 25, the wire member 17 as an engaged portion to which an end of the coil spring 16 is engaged is preferably disposed within wire member supporting members 60, 61, and 62 sewn by sewing and the like on the back face of the flat-type supporting member 15 with play movably or bendably. This structure makes a movable amount or a degree of bending of the wire member 17 variable depending on the weight of a seated person, and it is possible to let the spring characteristic of the wire member 17 (a feeling of fitting to the human body or vibration absorbency by a restoring force) work according to the difference in weight of the human body. Incidentally, though the details of this point will be described later, in the previously-described respective embodiments, it is the same as that the wire member 17 is preferably supported with the wire supporting members 60, 61, and 62 which are able to make the wire member 17 movable or bendable.

Figure 26:
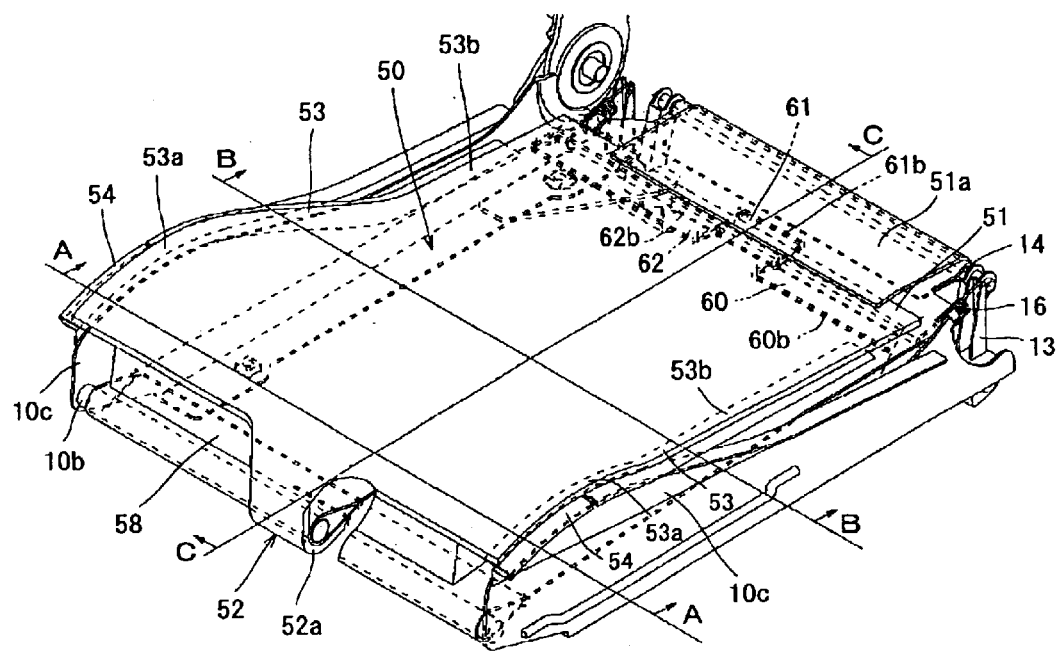
FIG. 26 is a schematic perspective view showing a seat cushion composing the seat structure relating to yet another embodiment of the present invention.
Figure 27:
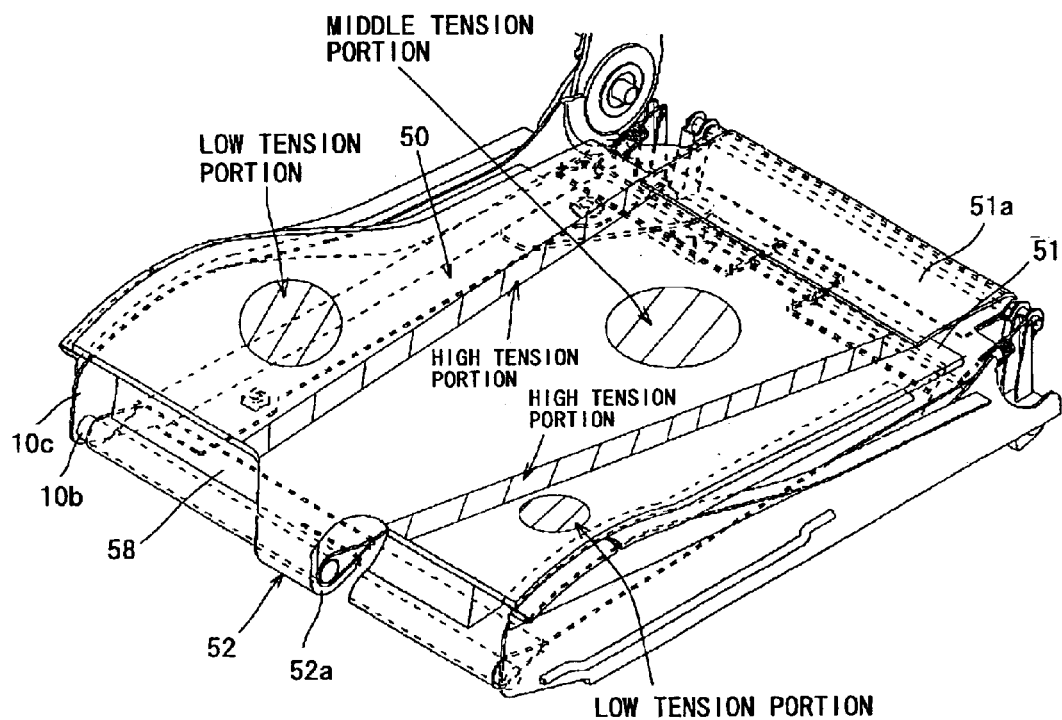
FIG. 27 is the same schematic perspective view as that in FIG. 26, showing formation positions of a high tensile portion, a medium tensile portion, and a low tensile portion diagrammatically.
Figure 28:
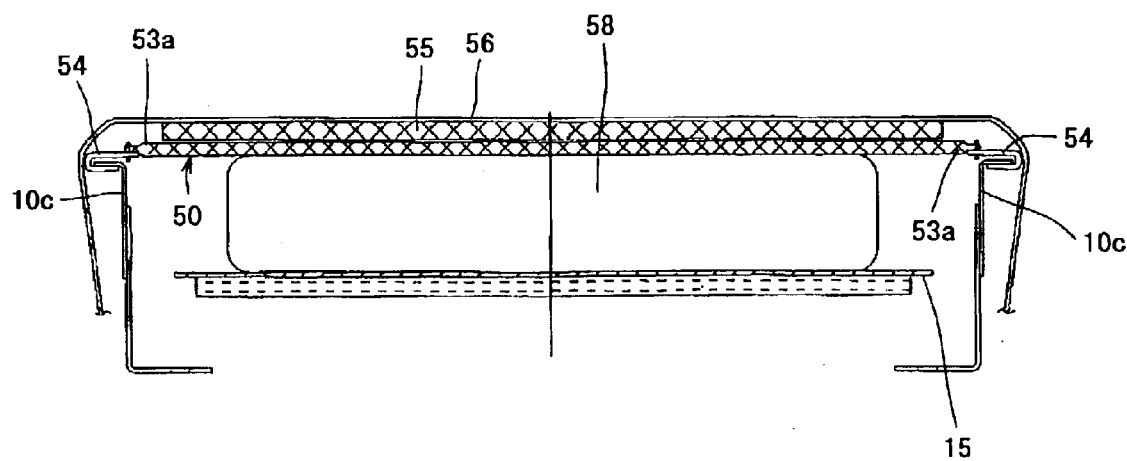
FIG. 28 is a sectional view taken along the line A—A in FIG. 26.
Figure 29:
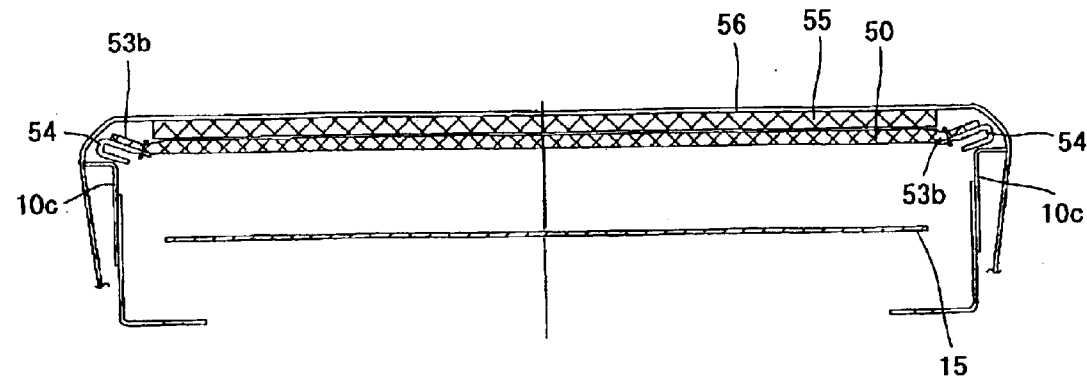
FIG. 29 is a sectional view taken along the line B—B in FIG. 26.

FIG. 26 to FIG. 30 are views showing still another embodiment of the present invention. In the present embodiment, after connecting a connecting fabric 51a to the rear end portion 51 as the cushioning member 50 for the seat cushion, the connecting fabric 51a is supported together with the flat-type supporting member 15 by the supporting frame 14 which is elastically supported with the torsion bar 12. It is nearly the same structure as the embodiment shown in FIG. 24 and FIG. 25 at this point. Provided that a front end portion 52 is not engaged to the front end frame 10b or the flat-type supporting member 15 at the whole portions in the width direction, a portion of the front end portion 52 in the width direction is connected to the front end frame 10b or the flat-type supporting member 15 as shown in FIG. 26. In the present embodiment, only a portion 52a of a predetermined width located at nearly central portion (in the range of 30 mm to 100 mm, preferably in the range of 50 mm to 70 mm) is connected to the flat-type supporting member 15, allowing to pass through under the front end frame 10b. Further, as shown in FIG. 28, as for a side edge portion 53, only a front portion 53a is engaged to the side frame 10c through a plate member (setting plate) 54 made of plastic and having substantially a U-shaped cross section in order to prevent depression and maintain the shape. However, a rear portion 53b which locates behind the front portion 53a is not engaged to the side frame 10c, as shown in FIG. 29. In the present embodiment, a setting plate 54 is disposed also on the rear portion 53b. Since when elongated by the tension in the longitudinal direction, it is curved and deformed so that the side edge portion 53 shrinks inside, this is provided to suppress the deformation and to maintain the shape of the cushioning member 50 for the seat cushion. Therefore, when the surface stiffness of the side edge portion 53 of the cushioning member 50 for the seat cushion to be used is high, for instance, when the side edge portion is folded back and treated by vibration welding, the provision is not necessary, and it is completely an optional matter.

By taking such a structure like this, while the cushioning member 50 for the seat cushion is strained while being kept in a predetermined shape at the time of no load, similarly to the embodiment shown in FIG. 24 and FIG. 25, when a person takes seat, the supporting frame 14 supported with the torsion bar 12 falls forward, and the tension is lowered, so that the spring characteristic of the cushioning member 50 for the seat cushion in the direction of the normal can be functioned sufficiently.

Since only the portion 52a with the predetermined width in the front end portion 52 of the cushioning member 50 for the seat cushion is connected to the flat-type supporting member 15, according to the present embodiment, as shown in FIG. 27, portion along imaginary lines connecting between each end portion of the portion 52a with the predetermined width and the vicinity of each side portion of the connecting fabric 51a which is connected to the rear end portion 51 of the cushioning member 50 for the seat cushion become high tension portions, a middle tension portion is formed between the high tension portions, and low tension portions are formed in the outsides of the high tension portion. That is, the cushioning member 50 for the seat cushion is structured with the middle tension portion supporting most part of the weight of the human, and the lower tension portion to damp vibration (especially high frequency vibration) bordering both with the high tension portion. Therefore, phase delay is created between the cushioning member 50 for the seat cushion and the flat-type supporting member 15, which makes the damping characteristic enhance further effectively. Further, the front portion 53c of the side edge portion 53 is engaged to the side frame 10c through the setting plate 54, but since the low tension portion exists adjacent with the front portion 53a, transmitted vibration through the side frame 10c and the setting plate 54 is damped by such a low tension portion.

Figure 30:
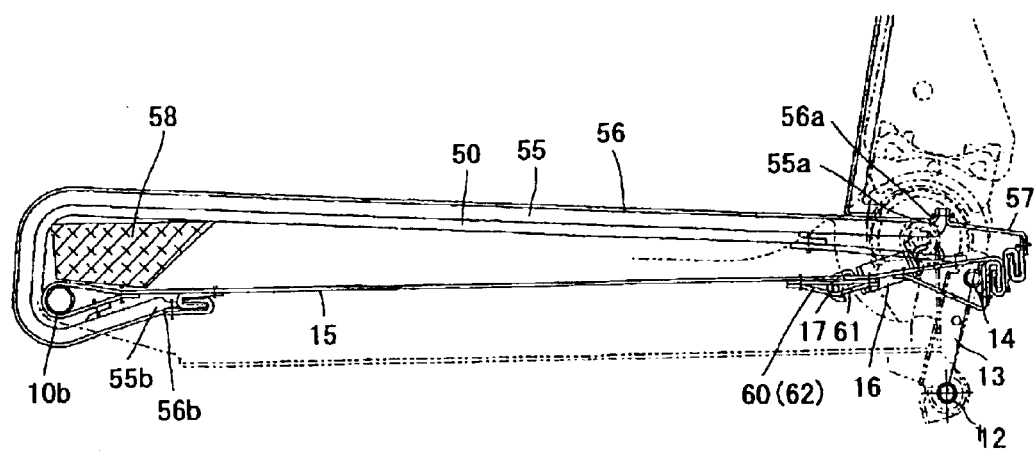
FIG. 30 is a sectional view taken along the line C—C in FIG. 26.

It should be noted that the solid knitted fabric, the urethane member, the two-dimensional net member and the like can be used as the cushioning member 50 for the seat cushion similarly to the embodiment shown in FIG. 24 and FIG. 25, and they can be used as a surface layer, but in this embodiment, as shown in FIG. 28 to FIG. 30, a supplementary cushioning member 55 and a separate surface layer member 56 such as leather and the like to give a soft feeling and touch are layered. Respective rear end portions 55a and 56a of the supplementary cushioning member 55 and the surface layer member 56 are connected to the supporting frame 14 supported with the torsion bar 12 through a connecting fabric 57 respectively, as shown in FIG. 30, and their front end portions 55b and 56b are connected to the flat-type supporting member 15, passing through under the front end frame 10b. It is preferable to dispose a cushioning member 58 having a small reaction force, viscoelastic urethane and the like for instance, between the cushioning member 50 for the seat cushion and the front end frame 10b. Owing to the cushioning member 58 which has a small reaction force, when, for instance, operating pedals on a car seat, since an input of a reaction force against the leg occurs little, little or no feeling of something foreign of the front end frame 10b is felt.

Here, detailed structures of the wire supporting members 60, 61, and 62 in the present embodiment which support the wire 17 as the engaged portion to which an end of the coil spring 16 is engaged will be explained. That is, as shown in FIG. 31, the wire supporting members 60, 61, and 62 are composed of cylindrical matter, and three pieces of the wire supporting members are used in the present embodiment. The wire member 17 is supported with the wire inserting portions 60a, 61a, and 62a by inserting the wire 17. The wire supporting members 60, 61, and 62 may be used as that previously formed in cylindrical, or may be made cylindrical by fixing the fabric member folded in two to the flat-type supporting member 15. The method to fix to the flat-type supporting member 15 is optional, and sewing, vibration welding, and the like can be used.

In the present embodiment, as shown in FIG. 31, it is made cylindrical by sewing the fabric member folded in two so as to overlap the open end sides with the flat-type supporting member 15. In both sides of the wire supporting members 60 and 62 supporting the vicinity of each end portion of the wire member 17, the overlapped portion of the open end side when folded in two faces the front side of the flat-type supporting member 15, so that the wire inserting portions 60a and 62a are positioned behind the positions of margin to seam 60b and 62b. In the wire supporting member 61 arranged in the middle portion, the overlapped portion of the open end side faces the rear side of the flat-type supporting member 15 so that the wire inserting portion 61a is positioned in front of the position of margin to seam 61b (refer to FIG. 26 and FIG. 31). Respective wire inserting portions 60a, 61a, and 62a are disposed in a positional relation so as to be inserted with no bending of the wire member 17, on a straight line, without undue stress, and loosely.

As a result of disposing the margins to seam 60b, 61b, and 62b facing the flat-type supporting member 15 as above, as shown in FIG. 26, the position of the margin to seam 61b of the wire supporting member 61 disposed in the middle is more rear end side than both margins to seam 60b and 62b, and the surface stiffness of a portion sandwiched between the margins to seam 60b and 62b in both sides in the flat-type supporting member 15 becomes smaller than the surface stiffness of portions where both margins to seam 60b and 62b are positioned. By setting the length of the portion sandwiched between margins to seam 60b and 62b in both sides to be in the range of 60 mm to 130 mm, preferably 80 mm to 100 mm, tuber of ischium portions are positioned on the portions where the margins to seam 60b and 62b in both sides having a high surface stiffness are positioned. Accordingly, a feeling of spring of the flat-type supporting member 15 to the tuber of ischium portion becomes strong, which permits to suppress a feeling of stagger, and at the same time to increase a feeling of fitting at the portion sandwiched between the margins to seam 60b and 62b in both sides.

Figure 31A:
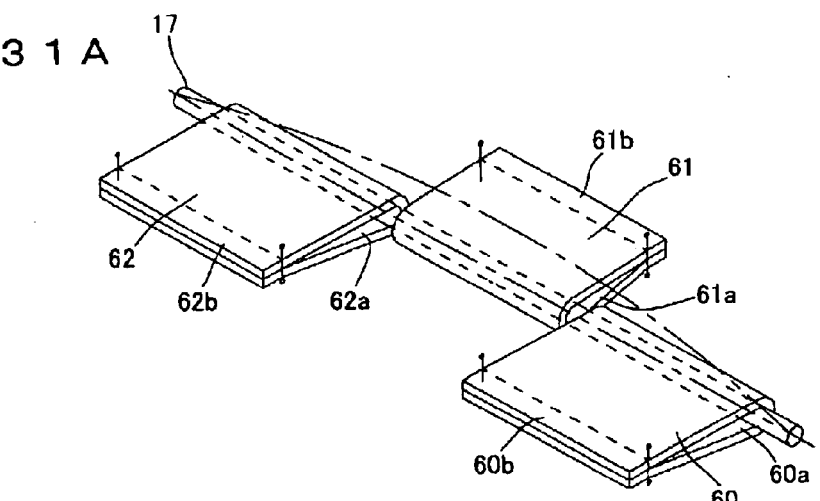
FIG. 31A is a view showing a concrete structure of a wire supporting member.
Figure 31B:
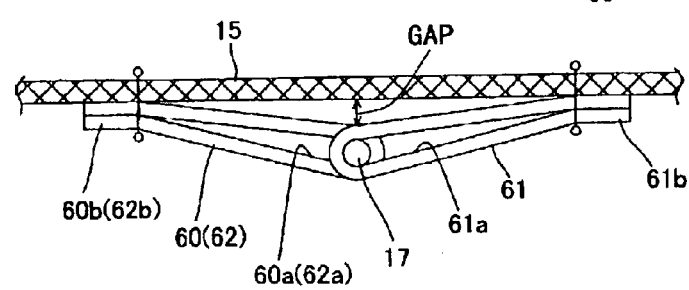
FIG. 31B is a schematic side view showing a portion of the concrete structure of the wire supporting member.

Further, since the wire member 17 is loosely inserted to respective wire inserting portions 60a, 61a, and 62a, as shown in FIG. 31A, when a person takes seat, the wire member 17 moves and curves at receiving of the load, so that substantially central portion of the wire member 17 bulges backward in the slanting downward direction. Accordingly, since a gap is formed between the flat-type supporting member 15 and substantially central portion of the wire member 17 (FIG. 31B), increase of the surface stiffness of the flat-type supporting member 15 at this portion can be prevented. Further, since the degree of moving or curving of the wire member 17 differs depending on the weight of a seated person, a feeling of spring or a feeling of fitting corresponding to the difference in weight can be displayed.

Figure 32A:
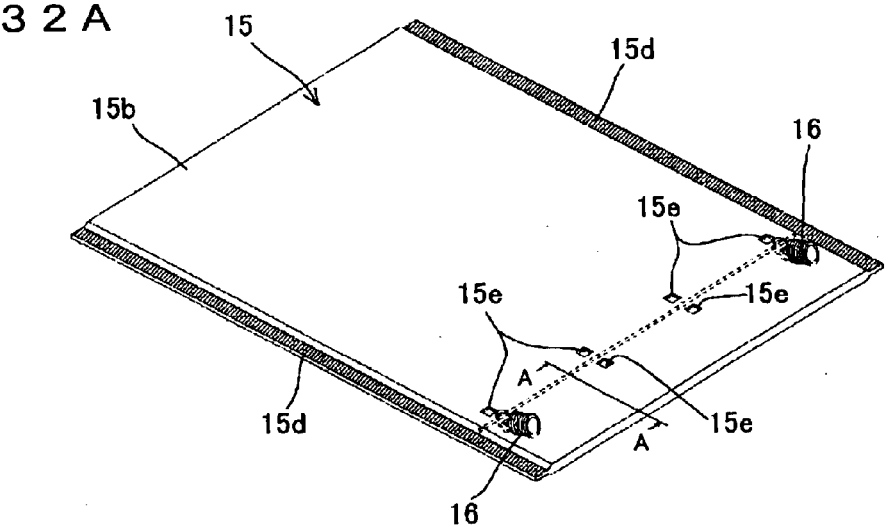
FIG. 32A is a perspective view showing an example of a structure when a solid knitted fabric is used as a flat-type supporting member.
Figure 32B:
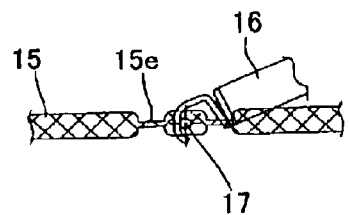
FIG. 32B is a sectional view taken along the line A—A in FIG. 32A.

As described above, as for the flat-type supporting member 15, any of a two-dimensional net member, a three-dimensional net member (a solid knitted fabric), a urethane material and so on can be used, and when the solid knitted fabric is used among them, it is preferable to take, for instance, a structure shown in FIG. 32A and FIG. 32B. That is, when the flat-type supporting member 15 made of a solid knitted fabric is used, the rear end portion 15a is engaged to the supporting frame 14, and the front end portion 15b is engaged to the front end frame 10b respectively. At this time, when tension is applied in the direction of longitudinally extending, the side portion 15d tends to deform so as to curve inwardly. If this happens, the reaction force against the periphery of the tuber of ischium becomes high, even when a solid knitted fabric having a load-deflection characteristic at the time of applying pressure substantially in the vertical direction (in the thickness direction) nearly equal to or lower than the load-deflection characteristic of the muscles in the human body is used, the characteristic can not be displayed sufficiently. Accordingly, in order to suppress the inward curving and deforming of the side portion 15d, it is preferable to take a structure in which, as shown in FIG. 32A, the side portion 15d is crushed by vibration welding to enhance the stiffness. Through this step, when a solid knitted fabric having a load-deflection characteristic nearly equal to or lower than the load-deflection characteristic of the muscles in the human body is used, the characteristic can be displayed sufficiently and the reaction force against the human body can be made small.

Further, as a solid knitted fabric is used, the wire member 17 to which an end of the coil spring 16 is engaged can take a structure to insertedly disposed the wire member 17 between ground knitted fabrics, as shown in FIG. 32A and 32B. Through this structure, as in the case of using a two-dimensional net member, it becomes unnecessary to dispose the wire supporting member 17a separately. When the wire member 17 is disposed insertedly between the ground knitted fabrics, though it is necessary to prevent falling off from the side portion 15d, if the side portion 15d is vibration welded as described above, the processing to prevent falling off from the side portion 15d can be performed at the same time. Incidentally, in FIG. 32A and FIG. 32B, a symbol 15e indicates a welding portion to substantially fix the position of the wire member formed by partially vibration welding of both side portions of the wire member 17 insertedly disposed between the ground knitted fabrics, which prevents departure of the wire member 17 insertedly disposed between the ground knitted fabrics from a predetermined position.

Figure 33A:
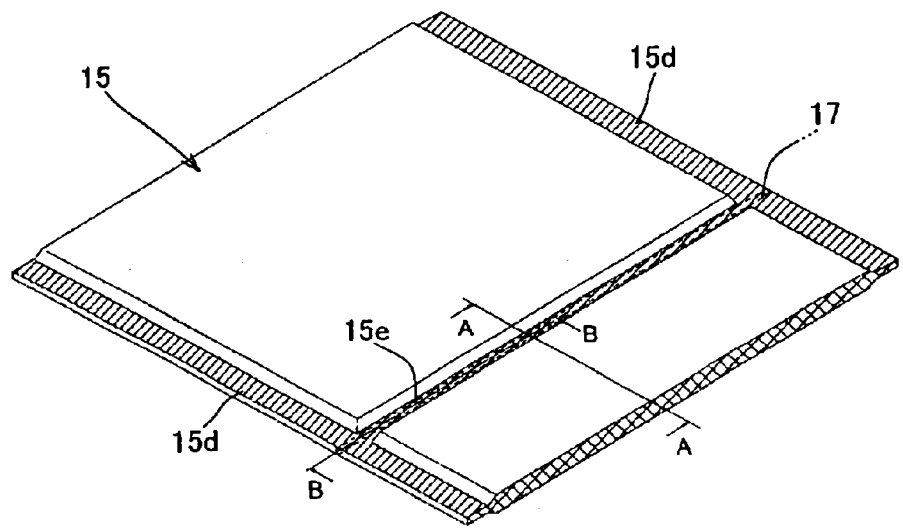
FIG. 33A is a perspective view showing another example of a structure using a solid knitted fabric as a flat-type supporting member.
Figure 33B:
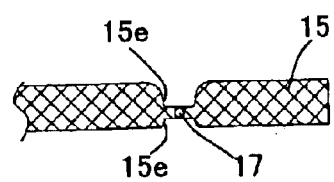
FIG. 33B is a sectional view taken along the line A—A in FIG. 33A.
Figure 33C:
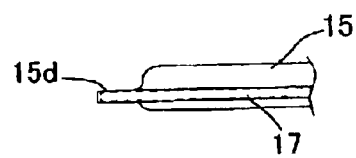
FIG. 33C is a sectional view taken along the line B—B in FIG. 33B.
Figure 34:
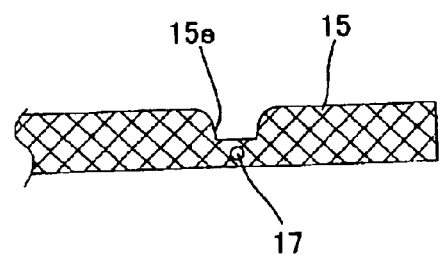
FIG. 34 is a view showing an example of a structure in which a formation means of a weld portion that controls the wire position in the embodiment shown in FIG. 33A.

FIG. 33A to FIG. 33C show another example of the embodiment using a solid knitted fabric as the flat-type supporting member 15 similarly to FIG. 32A and FIG. 32B. The embodiment shown in FIGS. 33A, 33B, and 33C differs from the embodiment shown in FIGS. 32A and 32B in the point that the welding portion 15e to fix the position of the wire member to prevent departure of the wire member 17 from the predetermined position is formed by vibration welding along the wire member 17 insertedly disposed between the ground knitted fabrics. Note that though a pair of ground knitted fabrics are crushed from both faces along the wire member 17 to form the welding portion 15e to fix the position of the wire member in FIGS. 33A, 33B, and 33C, the welding portion 15e to fix the position of the wire member can be formed by vibration welding only one side of the ground knitted fabric as shown in FIG. 34.

According to the seat structure of the present invention, as described above, when impact load or vibration larger than predetermined is inputted by collision and the like, the amount of depression of the flat-type supporting member 15 corresponding to the vicinity of the tuber of ischium where is the barycentric position to the standard posture becomes large, and then, the vicinity of the tuber of ischium is further depressed by elongation of the flat-type supporting member 15, and the leg tends to be raised upward, which results in generation of rotational moment around the vicinity of the tuber of ischium (refer to FIG. 3). Therefore, the seat structure of the present invention has a function and an effect to suppress a force to alienate the human body from a seat surface, to push the back of the human body to the seat back of the seat, and to reduce effectively an impact applied to the human body.

Needless to say, followed to the above, the amount of depression of the cushioning member for the seat cushion disposed above the flat-type supporting member 15 becomes large. However, when the lower end of a cushioning member 70 for the seat back is integrally connected to the cushioning member of the seat cushion by sewing and the like, while the amount of depression of the cushioning member for the seat cushion and the flat-type supporting member 15 become large, the tension of the cushioning member 70 for the seat back becomes high. Accordingly, even when the rotational moment around the vicinity of the tuber of ischium is given to the human body, and the human body is intended to be pushed to the seat back of the seat, a force to rebound the back of the human body by the tension of cushioning member 70 for the seat back may become large.

Therefore, as a cushioning member 70 for the seat back, it is preferable to form a cushioning member 70 for the seat back in a bulging shape to bulge in advance at least a portion including the vicinity of the waist portion (hereinafter, referred to as a "substantially central portion") in front of the seat. Since it is bulged out forward in advance, the waist portion of the human body can be supported at the time of normal seating, and when the back of the human body is pushed to the seat back by the rotational moment described above, since it is deformed into substantially flat so as that the bulging shape is cancelled, the tension is not getting high during that time, and a force to rebound the human body does not become large.

Figure 35:
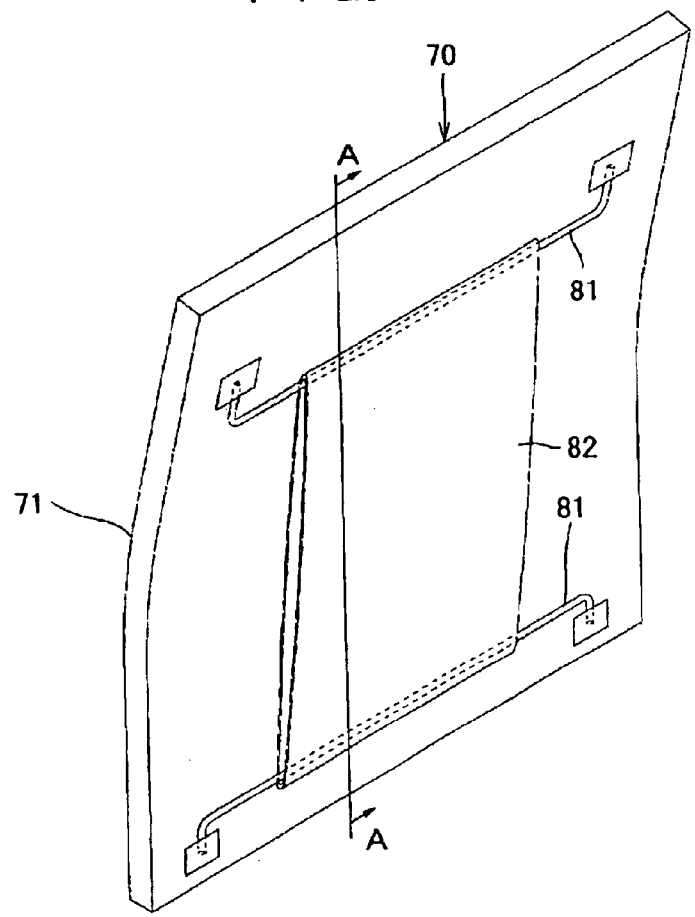
FIG. 35 is a schematic perspective view showing an example of a cushioning member for a seat back bulged forward.
Figure 36:
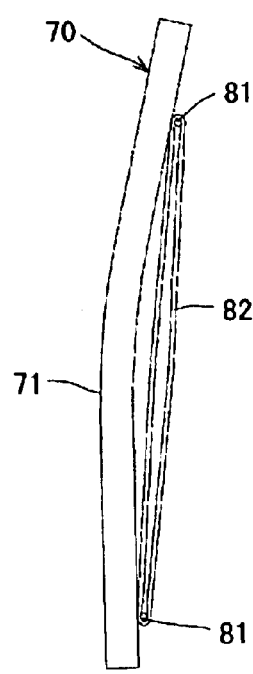
FIG. 36 is a sectional view taken along the line A—A in FIG. 35.
Figure 37:
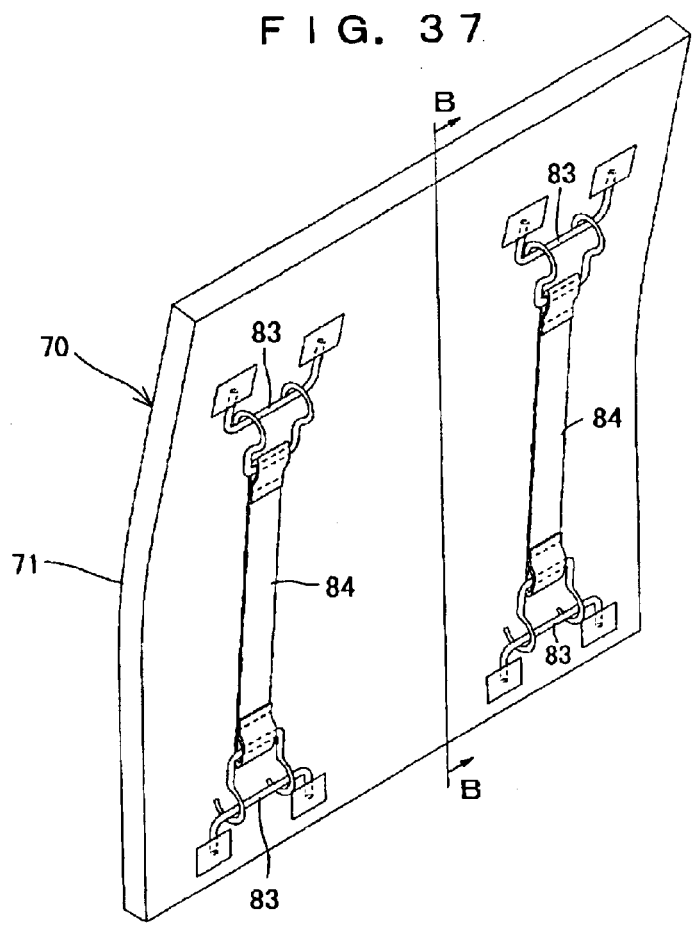
FIG. 37 is a schematic perspective view showing another example of a cushioning member for a seat back bulged forward.
Figure 38:
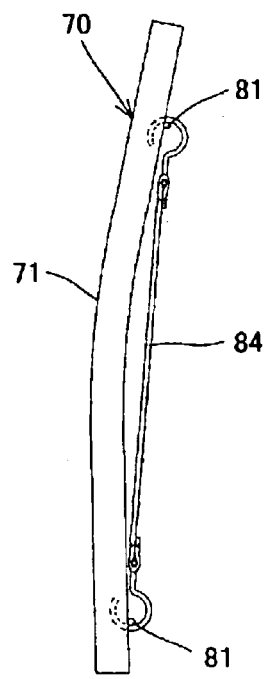
FIG. 38 is a sectional view taken along the line B—B in FIG. 37.
Figure 39:
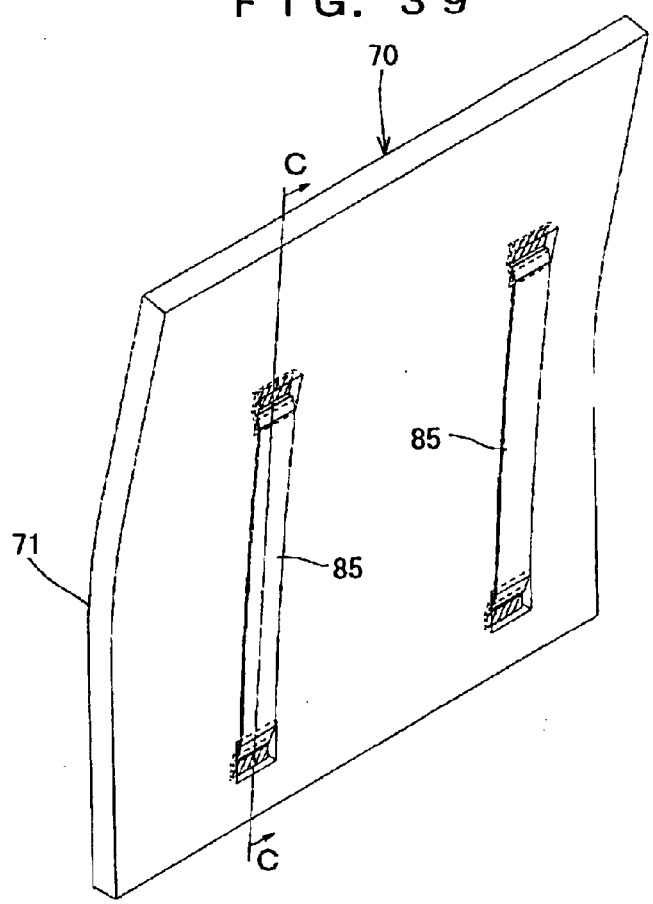
FIG. 39 is a schematic perspective view showing still another example of a cushioning member for a seat back bulged forward.
Figure 40:
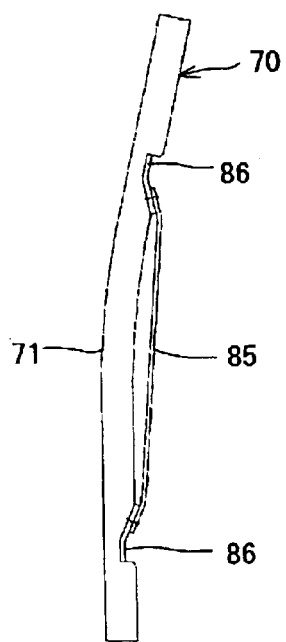
FIG. 40 is a sectional view taken along the line C—C in FIG. 39.

Examples of concrete forms to provide the cushioning member 70 for the seat back in such a bulging shape are shown in FIG. 35 to FIG. 40. The example shown in FIG. 35 and FIG. 36 is a structure in which engaging wires 81 are provided on the back face of the cushioning member 70 for the seat back substantially in parallel putting interval vertically, a rubber band 82 is strained between the engaging wires 81, and nearly central portion 71 of the cushioning member 70 for the seat back is allowed to bulge out forward by the tension of the rubber band 82. End portions of respective engaging wires 81 are fixed to the cushioning member 70 for the seat back by sewing or vibration welding. The example shown in FIG. 37 and FIG. 38 is a structure in which a pair of engaging wires 83 are disposed at a vertical distance, two sets of the pair are arranged apart from each other in the width direction, rubber bands 84 are respectively engaged between respective sets of the engaging wires 83 so that nearly central portion 71 of the cushioning member 70 for the seat back is allowed to bulge out. The example shown in FIG. 39 and FIG. 40 is a structure in which each end portion of a rubber band 85 is fixed to the back face of the cushioning member 70 for the seat back, for instance, through a plastic plate 86 by vibration welding or sewing and nearly central portion 71 of the cushioning member 70 for the seat back is allowed to bulge out by the tension of the rubber band 85.

Examples shown in FIG. 35 to FIG. 40 are only for showing examples, so far as elastic members in which respective end portions thereof are engaged at a predetermined vertical distance are provided on the back face of the cushioning member 70 for the seat back, and nearly central portion 71 of the cushioning member 70 for the seat back can be bulged out forward by the tension of the elastic member, any structure is adoptable. For instance, as an elastic member, a metal spring and the like can be used in place of respective rubber bands described above. It should be noted that as for the cushioning member 70 for the seat back, a three-dimensional net member (a solid knitted fabric), a urethane material, a two-dimensional net member and so on can be used, and plurality of these members can be used in layers. However, as in the case of the cushioning member for the seat cushion, it is preferable to use a solid knitted fabric which has a sufficient cushioning property even it is a thin type.

Figure 41A:
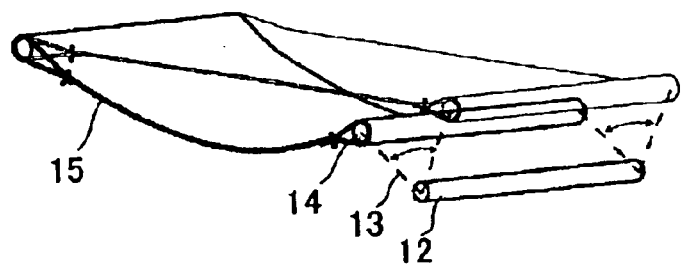
FIG. 41A, FIG. 41B, and FIG. 41C are views for explaining a supporting means of the flat-type supporting member.
Figure 41B:
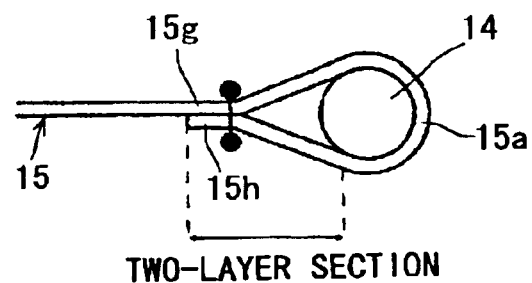
Figure 41C:
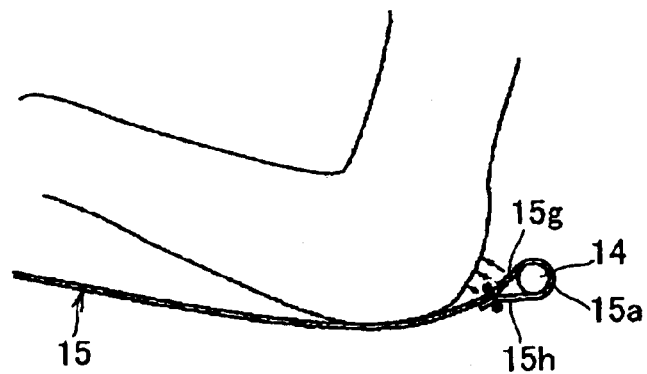

Here, in respective embodiments described above, for instance, as shown in FIG. 1 to FIG. 4, the rear end portion 15a of the flat-type supporting member 15 is passed around the supporting frame 14 and fixed thereto. More concretely, as shown in FIG. 41A and FIG. 41B, the rear end portion 15a is passed around the outer surface of the supporting frame 14 and to the portion (upper layer portion) 15g positioned on front side of the rear end portion 15a, a folded back portion 15h folded back by the supporting frame 14 is projected to the front of the supporting frame 14, and both are overlapped and fixed by sewing and the like. Through this structure, a section (two-layer section) is created, in which the flat-type supporting member 15 is arranged finally into two layers of the upper layer portion 15g and folded back portion 15h, in front side of the supporting frame 14. Accordingly, the surface stiffness is high within such a two-layer section, and shape follow-up characteristic is lowered. When a person takes seat, as shown in FIG. 41C, the haunches positioned in such a section has a tendency of being pushed out forward. Further, since the rear end portion 15a is, in a sense, bounded by the supporting frame 14, when vibration is inputted in a state of taking seat, an elastic force of the torsion bar 12 functioned through the supporting frame 14 and the arm 13 is limited by the tension of the flat-type supporting member 15, the function of the torsion bar 12 is restricted.

That is, it becomes a weight subtraction state, in other words, a state of loosing downward load of the weight of the human body by loosing its downward pressure due to upward movement of the vibration, by inputting vibration upward, and when the tension of the flat-type supporting member 15 is lowered, the lowered tension of the flat-type supporting member 15 affects the torsion bar 12.

Figure 42A:
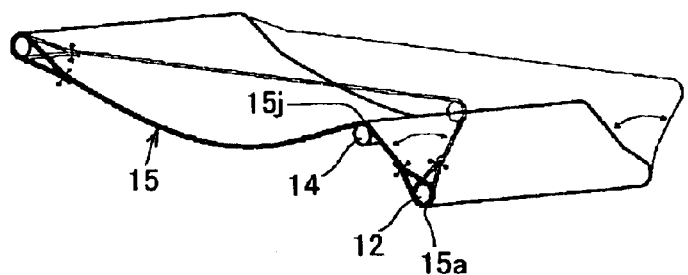
FIG. 42A and FIG. 42B are views for explaining an example of a preferable supporting means of the flat-type supporting member.
Figure 42B:
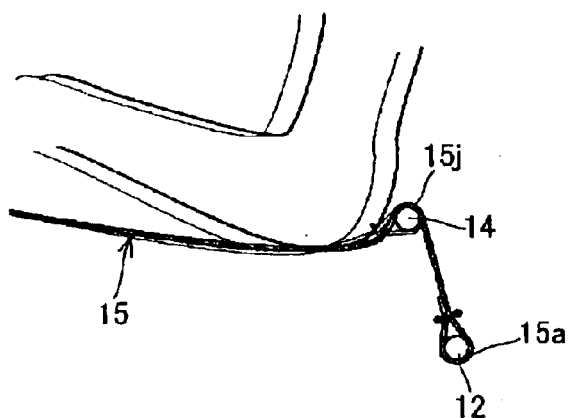

Therefore, it is preferable that the rear end portion 15a of the flat-type supporting member 15 is supported as follows. That is, as shown in FIG. 42A, the flat-type supporting member 15 is not directly fixed to the supporting frame 14, as to the supporting frame 14, the flat-type supporting member 15 is hung around the supporting frame 14 from above and the rear end portion 15a is connectedly fixed to the torsion bar 12 arranged under the supporting frame 14. Through this structure, the flat-type supporting member 15 does not create a two-layer section just in front of the portion (abutting portion to the supporting frame 15j) where the flat-type supporting member 15 is hung around the supporting frame 14. Accordingly, the surface stiffness at the portion just in front of the supporting frame 14 is never increased compared to other portions. When vibration is inputted, and if upward vibration is inputted (weight subtraction state), since a force by which the supporting frame abutting portion 15j is pushed to the supporting frame 14 becomes small instantaneously, or disappears, the torsion bar 12 functions without being affected by the tension of the flat-type supporting member 15, so that responsibility of movement of the supporting frame 14 by the elastic force of the torsion bar 12 is improved. Accordingly, as shown in FIG. 42B, when a person takes seat, the shape follow-up characteristic to the haunches is improved more than the case in FIG. 41C, and the haunches are not likely to be pushed forward.

Figure 43A:
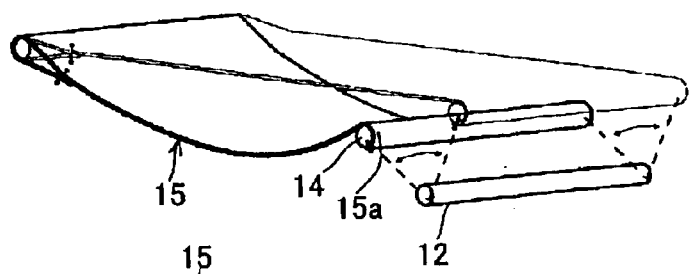
FIGS. 43A and 43B are views for explaining another example of the preferable supporting means of the flat-type supporting member
Figure 43B:
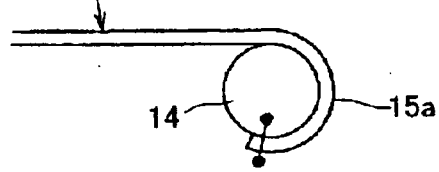

Further, it is also effective to take a supporting means shown in FIG. 43A and FIG. 43B. That is, though this example is the same as the supporting means shown in FIGS. 41A, 41B and 41C on the point that the rear end portion 15a of the flat-type supporting member 15 is directly fixed on the supporting frame 14, this example takes a structure of fixing the fold back portion 15h which is folded back by the supporting frame 14 to the outer surface of the supporting frame 14 in close contact so as not to project the fold back portion 15h in front of the supporting frame 14. Though this example is the same as the example shown in FIGS. 41A, 41B, and 41C on the point that the rear end portion 15a of the flat-type supporting member 15 is restricted by the supporting frame 14, and the function of the torsion bar 12 is controlled by the tension of the flat-type supporting member 15, since no two-layer section is formed which is composed of a portion (upper layer portion) 15g positioned on the front side of the rear end portion 15a, and the fold back portion 15h, as shown in FIG. 41B, and FIG. 41C, there is no increase in the surface stiffness at the portion coming into contact with the haunches compared with other portions. Therefore, the example shown in FIG. 43A and FIG. 43B is inferior to the form shown in FIG. 42A and FIG. 42B, but it is more improved in shape follow-up characteristic when compared with the form shown in FIGS. 41A, 41B, and 41C.

The seat structure in the present invention includes a torsion bar disposed along the width direction, and an arm which is connected to the torsion bar, enforced in the direction of falling backward at a normal state by the torsion bar, in the rear of the seat cushion; and disposed is a flat-type supporting member between the supporting frame supported with the arm and the frame member provided in front of the seat cushion, being strained by the elastic force of the torsion bar. Through this structure, the spring characteristic to give an influence on comfortability and riding comfort at the time of being seated can be given by the torsion bar, so that the number of coil springs which has been necessary in the vicinity of the body side can be reduced or the use of the coil spring can be stopped. Accordingly, a surface cushioning layer arranged on the flat-type supporting member can be made thinner than before, or the number of layers for the cushioning layer can be reduced so that the seat structure can be reduced in weight. Moreover, the use of the torsion bar improves the vibration absorbency, and the control of the pivoting angle of the torsion bar allows the function of the flat-type supporting member to display sufficiently owing to its elongation when a large load is inputted, impact at the time of receiving a large load can be reduced owing to the rotational moment around the vicinity of the tuber of ischium of the human body, and impact absorbency can be further improved.

Furthermore, since the torsion bar is structured to change its pivoting angle in response to difference in physique, and difference in posture, it does not damage the fittability of the flat-type supporting member to the human body regardless of difference in physique and difference in posture, and is excellent in physique difference absorbency, posture difference absorbency, body movability. Therefore, even to a deformed posture such as a so-called sacrum posture and the like, agreeable seating comfort can be given by deformation of the flat-type supporting member in response thereto, which contributes to the improvement of seating comfort for a wheel chair user.

While preferred embodiments of the invention have been described with a certain degree of particularity with reference to the drawings, obvious modifications and variations are possible in light of the above teachings. The scope of the invention is to be determined from the claims appended thereto.

What is claimed is:

1. A seat structure comprising:
    an arm disposed on a rearward portion of a seat cushion, and enforced in a direction of tilting backward with a torsion bar in a normal state; and
    a flat-type supporting member stretched across between a supporting frame supported by said arm and a frame member disposed in front of the seat cushion, being strained by an elastic force of the torsion bar.

2. The seat structure according to claim 1, further comprising:
    a stopper member to control a range of a pivot movement when said arm pivots in a direction of tilting forward against the elastic force of the torsion bar when said flat-type supporting member receives a load nearly in a vertical direction.

3. The seat structure according to claim 1, wherein said torsion bar is disposed along a width direction on a rear of the seat cushion.

4. The seat structure according to claim 1, wherein said flat-type supporting member is suspended on said supporting frame, and connectedly strained by said torsion bar disposed below the supporting frame at a rear end portion of said flat-type supporting member.

5. The seat structure according to claim 1, wherein said flat-type supporting member is fixed in a manner that the rear end portion thereof is fixed on said supporting frame in intimate contact with an outer face of said supporting frame so that a fold-back portion of the rear end portion folded back along the outer face of the supporting frame does not overlap on a portion positioned in front of the rear end portion abutting said supporting frame.

6. The seat structure according to claim 1, further comprising:
an auxiliary spring means disposed between said flat-type supporting member and a frame member positioned in the rear of the seat cushion.

7. The seat structure according to claim 6, wherein said auxiliary spring means comprises a coil spring put over between an engaged portion positioned within 150 mm front and 150 mm behind of a barycentric position of a body when seated, and the frame member positioned in the rear of the seat cushion.

8. The seat structure according to claim 7, wherein the engaged portion comprises a wire member supported at its midsection in a longitudinal direction and along a width direction of said flat-type supporting member, and has a structure that one end of the coil spring is engaged to the wire member.

9. The seat structure according to claim 8, wherein a least a portion of said wire member is loosely inserted in a wire supporting member disposed on the flat-type supporting member.

10. The seat structure according to claim 9, wherein said wire supporting member comprises plural cylindrical members provided with wire inserting portions, at least cylindrical members supporting approximately both ends of the wire member are fixed to the flat-type supporting member at the front sides of the cylindrical members so that the wire inserting portions are located at the rear sides, and a cylindrical member supporting central portion of the wire member is fixed to the flat-type supporting member at a rear side of the cylindrical member so that the wire inserting portion is located at the front side.

11. The seat structure according to claim 8, wherein said wire member is made of spring steel.

12. The seat structure according to claim 7, wherein said auxiliary spring means comprises a flat-type elastic member disposed below said flat-type supporting member having structure in which a front portion of the wire is connectedly supported by a frame member positioned in the front of the seat cushion, a rear wire constitutes the engaged portion, and one end of the coil spring is engaged to the rear portion of the wire.

13. The seat structure according to claim 2, wherein said stopper member is made of an elastic member.

14. The seat structure according to claim 1, wherein a load-deflection characteristic of said flat-type supporting member when being pressur vertical direction in a strained state is nearly equal to or lower than load-deflection characteristics of muscles in a human body.

15. The seat structure according to claim 14, wherein said flat-type supporting member comprises a two-dimensional net member, a solid knitted fabric, a urethane member, or a combination of two kinds or more of these members.

16. The seat structure according to claim 15, wherein said flat-type supporting member is made from a combination of the same kind or different kind of materials, and is composed of materials that have different spring characteristic or damping characteristic.

17. The seat structure according to claim 1, further comprising:
a cushioning member for the seat cushion provided above said flat-type supporting member,
wherein said cushioning member is disposed in the rear of the seat cushion at the rear end portion thereof, supported together with said flat-type supporting member by a supporting frame enforced in the direction of tilting backward in a normal state with a torsion bar through said arm, and an amount of tension of said cushioning member for the seat cushion in a longitudinal direction when being seated is lower than when there is no load as a result of tilting forward of said supporting frame due to a load when seating.

18. The seat structure according to claim 17, wherein said cushioning member for the seat cushion is engaged either to the frame member provided in front of the seat cushion or to the flat-type supporting member engaged to the frame member at only one portion of the front end portion thereof.

19. The seat structure according to claim 18, wherein a portion having a predetermined width at a nearly central position in the width direction in the front end portion of said cushioning member for the seat cushion is engaged either to the frame member provided in front of the seat cushion or the flat-type supporting member engaged to the frame member.

20. The seat structure according to claim 1, further comprising:
a cushioning member for a seat back,
wherein said cushioning member for the seat back is connected to the seat cushion at the lower end portion thereof, and has a bulging shape bulging out in a forward direction at nearly the central position thereof.

21. The seat structure according to claim 20, further comprising:
an elastic member engaged to the back face of said cushioning member for the seat back,
wherein each end portion of said elastic member is engaged to the back face of said cushioning member for the seat back vertically at predetermined intervals from top to bottom, and a central portion of the cushioning member for the seat back bulges out forward under tension of the elastic member.

* * * * *